(12) United States Patent
Kim et al.

(10) Patent No.: US 9,195,342 B2
(45) Date of Patent: Nov. 24, 2015

(54) TOUCH SCREEN SENSOR INTEGRATED CIRCUITS, METHODS OF OPERATING THE SAME, AND SYSTEMS HAVING THE TOUCH SCREEN SENSOR INTEGRATED CIRCUITS

(75) Inventors: Ki-Duk Kim, Hwaseong-si (KR); Yoon Kyung Choi, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 587 days.

(21) Appl. No.: 13/605,603

(22) Filed: Sep. 6, 2012

(65) Prior Publication Data

US 2013/0063396 A1 Mar. 14, 2013

Related U.S. Application Data

(60) Provisional application No. 61/532,694, filed on Sep. 9, 2011.

(51) Int. Cl.
*G06F 3/045* (2006.01)
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
None
See application file for complete search history.

(56) References Cited

U.S. PATENT DOCUMENTS

2010/0060609 A1 3/2010 Doi et al.
2012/0200524 A1* 8/2012 Vallis et al. .................. 345/174

FOREIGN PATENT DOCUMENTS

JP 2010015262 A 1/2010
KR 20100029421 A 3/2010

OTHER PUBLICATIONS

Kim, H.R. et al., "A Mobile-Display-Driver IC Embedding a Capacitive-Touch-Screen Controller System," ISSCC Dig. Tech. Papers, pp. 114-115, Feb. 2010.

* cited by examiner

*Primary Examiner* — Nicholas Lee
(74) *Attorney, Agent, or Firm* — Harness, Dickey & Pierce, P.L.C.

(57) ABSTRACT

At least one example embodiment discloses a sensor circuit capable of processing a second input signal received via a sensing line by using a demodulation path for performing a demodulation operation or processing the second input signal by using a non-demodulation path that does not perform the demodulation operation, according to a level of a first input signal, for example, a noise signal, received via the sensing line.

18 Claims, 19 Drawing Sheets

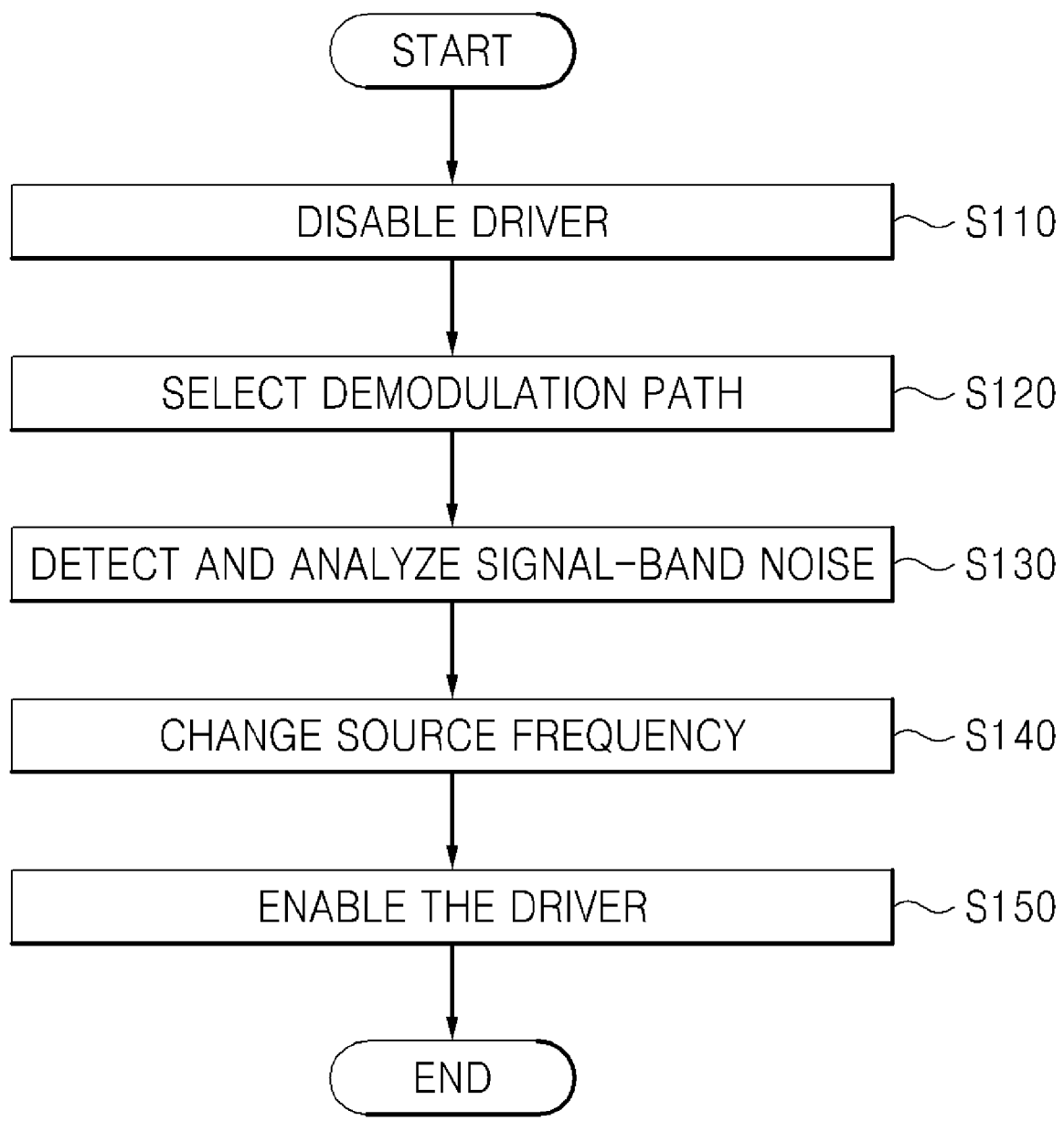

TOUCH SCREEN SENSOR INTEGRATED CIRCUITS, METHODS OF OPERATING THE SAME, AND SYSTEMS HAVING THE TOUCH SCREEN SENSOR INTEGRATED CIRCUITS

CROSS-REFERENCE TO RELATED APPLICATIONS

This application claims priority to U.S. provisional patent application No. 61/532,694 filed on Sep. 9, 2011, the entire contents of which are hereby incorporated by reference.

BACKGROUND

Example embodiments relate to an adaptive touch sensing scheme based on noise detection, and more particularly, to a touch screen sensor integrated circuit (IC) which senses a true multi-touch, a method of operating the touch screen sensor IC, and a system including the touch screen sensor IC.

Capacitive-type touch systems are widely used in mobile appliances such as a smart phone and a tablet personal computer (PC), because they provide high durability and high light transmittance and have multi-touch features and soft-touch features.

Meanwhile, capacitive-type touch systems require a variety of functions, for example, true multi-touch detection, high noise-immunity, and low power consumption.

Recently, a capacitive-type touch screen controller built in a display driver IC has been introduced in Hyoung-Rae Kim et al., "A Mobile-Display-Driver IC Embedding a Capacitive-Touch-Screen Controller System", ISSCC Dig. Tech. Papers, pp. 114-115, February 2010.

A 1-chip solution including the display driver and the touch screen controller may reduce manufacturing costs of capacitive-type touch systems. However, the touch controller supports only a single touch or two virtual touches that use a gesture because the touch controller is based on projected capacitive touch sensing that provides an independent 1-dimensional profile for each signal of a driving line and signal of a sensing line.

In addition, because of a low signal-to-noise ratio (SNR), the touch controller may not accurately sense a touch point under strong noise environments.

SUMMARY

According to an example embodiment, there is provided a method of operating a tough screen sensor integrated circuit (IC), the method includes determining if a first input signal output from a capacitive touch screen panel is within a noise window, selecting one of a demodulation path and a non-demodulation path according to the determining and processing a second input signal output from the capacitive touch screen panel using the selected one of the demodulation path and the non-demodulation path.

The selecting includes selecting the non-demodulation path if the first input signal is within the noise window and selecting the demodulation path if the first input signal is outside the noise window. The processing includes detecting a peak value of the second input signal and maintaining the detected peak value if the non-demodulation path is selected, and demodulating the second input signal if the demodulation path is selected.

The demodulating of the second input signal includes removing noise from the second input signal, demodulating the second input signal from which the noise has been removed and removing noise from the demodulated second input signal.

The method further includes adjusting an offset voltage of a signal corresponding to a result of the processing.

According to another example embodiment, there is provided a touch screen sensor IC including a plurality of unit sensing circuits that senses and amplifies signals respectively output from a plurality of sensing lines of a capacitive touch screen panel, respectively.

Each of the plurality of the unit sensing circuits includes a first selector which transmits an input signal output from a corresponding sensing line from among the plurality of the sensing lines to a demodulation path or a non-demodulation path in response to a selection signal, a second selector which outputs a signal output from the demodulation path or the non-demodulation path in response to the selection signal and a noise detector which determines whether a noise signal output from the sensing line exists within a noise window and outputs the selection signal according to a result of the determination during a noise detecting operation, and maintaining the selection signal during a sensing operation.

The demodulation path includes a first filter which removes a noise signal from an output signal of the first selector, a demodulator which demodulates an output signal of the first filter and a low pass filter (LPF) which performs low pass filtering with respect to an output signal of the demodulator.

The first filter is an anti-harmonic filter and the demodulator is a square-wave demodulator. The non-demodulation path includes a peak detector which detects a peak value of the output signal of the first selector and maintains the detected peak value. The touch screen sensor IC further includes an offset adjusting circuit which adjusts an offset of an output signal of the second selector.

Each of the plurality of the unit sensing circuits includes a charge amplifier connected between the respective sensing line and the first selector, the noise detector determines whether a noise signal output from the charge amplifier exists within the noise window and outputs the selection signal according to a result of the determination during the noise detecting operation.

According to another example embodiment, there is provided a system including the touch screen sensor IC and a host controller which communicates with the touch screen sensor IC.

Another example embodiment discloses a system including a panel including a plurality of driving lines and sensing lines and a sensor circuit block, the sensor circuit block including unit sensor circuits associated with the sensing lines, respectively, at least one unit sensor circuit including, a first path and a second path, the unit sensor circuit configured to receive a signal on the associated sensing line, detect a noise on the associated sensing line, and process the received signal through one of the first path and the second path based on the detected noise, the first path configured to maintain a peak value associate with the received signal and the second path configured to demodulate the received signal.

The second path includes a first filter configured to remove the noise, a demodulator configured to demodulate an output signal of the first filter and a low pass filter (LPF) configured to perform low pass filtering with respect to an output signal of the demodulator.

The peak detection path includes a peak detector configured to detect the peak value associated with the received signal and maintain the detected peak value.

BRIEF DESCRIPTION OF THE DRAWINGS

Example embodiments will be more clearly understood from the following detailed description taken in conjunction with the accompanying drawings in which:

FIG. 18 is a flowchart of a method of adjusting a source frequency according to the embodiment illustrated in FIG. 16 or 17 according to an example embodiment.

DETAILED DESCRIPTION

Figure 1A:
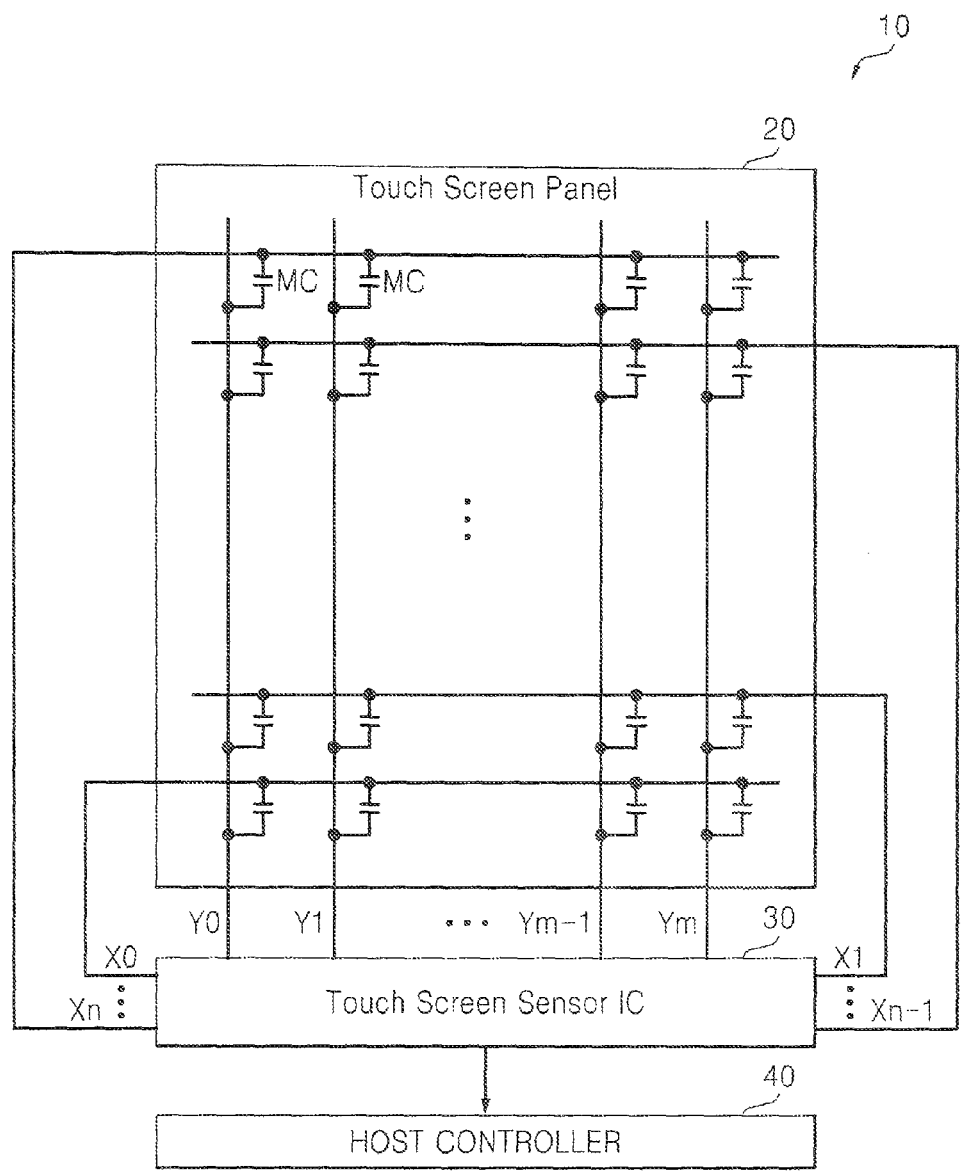
FIG. 1A is a schematic block diagram of a system including a touch screen sensor integrated circuit (IC), according to an example embodiment.

Various example embodiments will now be described more fully with reference to the accompanying drawings in which some example embodiments are shown. Inventive concepts may, however, be embodied in different forms and should not be construed as limited to the embodiments set forth herein. Rather, example embodiments are provided so that this disclosure is thorough and complete and fully conveys inventive concepts to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of inventive concepts. As used herein, the singular forms "a," "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of inventive concepts.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of inventive concepts will now be described with reference to the accompanying drawings.

Figure 1B:
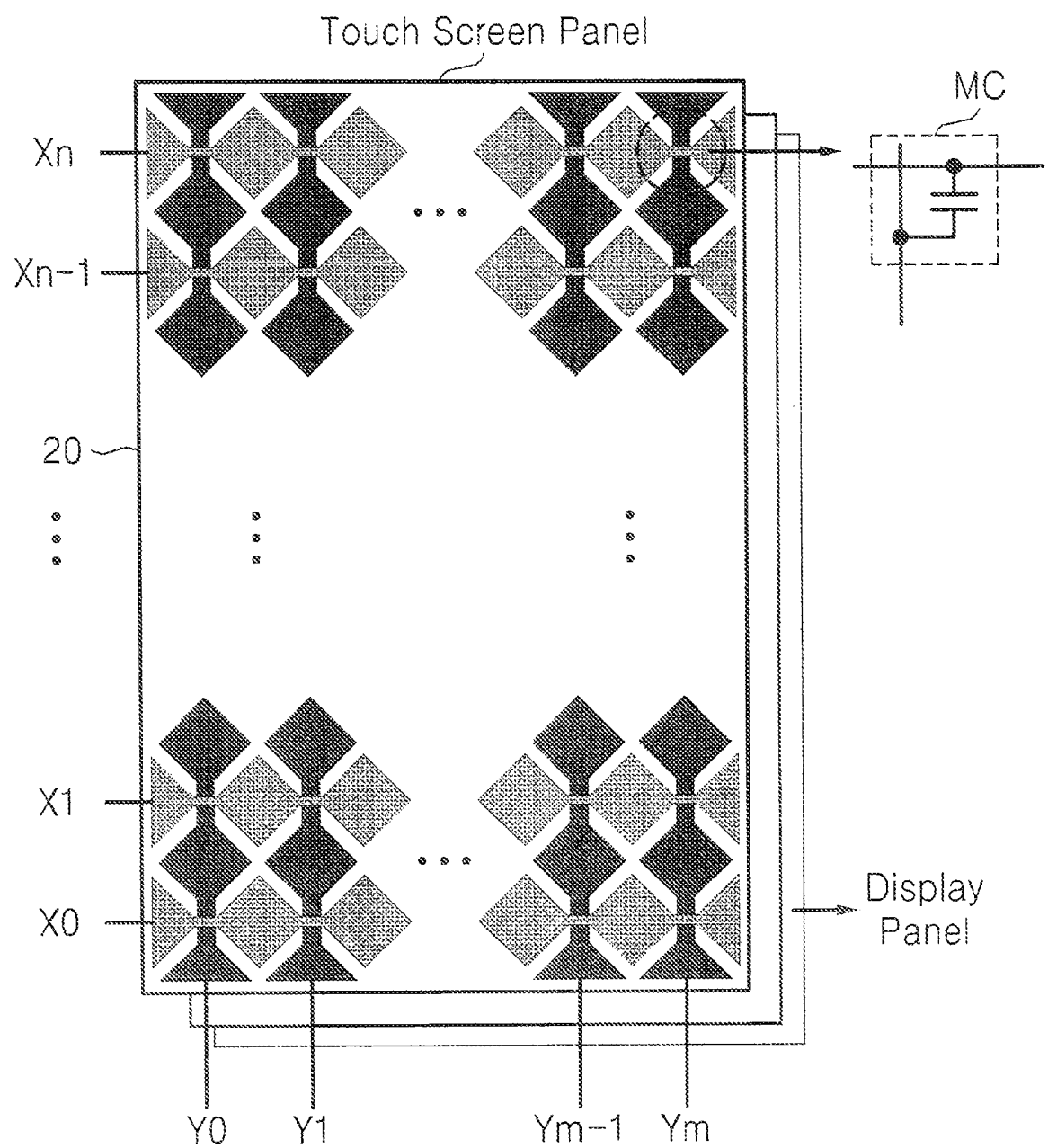
FIG. 1B illustrates a single-layer capacitive-touch screen panel which is illustrated in FIG. 1A and has a diamond pattern according to an example embodiment.

FIG. 1A is a schematic block diagram of a system 10 including a touch screen sensor integrated circuit (IC) 30, according to an example embodiment. FIG. 1B illustrates a single-layer capacitive touch screen panel which is illustrated in FIG. 1A and has a diamond pattern.

Referring to FIG. 1A, the system 10 includes a touch screen panel 20, the touch screen sensor IC 30, and a host controller (or an application processor (AP)) 40. In FIG. 1A, a display panel and a display panel driver IC for driving the display panel are not illustrated separately for convenience of explanation and the system 10 is not limited to what is shown in FIG. 1A.

The system 10 may be a mobile device such as a mobile phone, a smart phone, a tablet PC, a personal digital assistant (PDA), a portable multimedia player (PMP), or an MP3 player.

Referring to FIG. 1B, the touch screen panel 20 may be implemented using a single-layer capacitive touch screen panel having a diamond pattern. The single-layer capacitive touch screen panel includes a plurality of driving lines X0 through Xn (where n denotes a natural number, for example, n=18) and a plurality of sensing lines Y0 through Ym (where m denotes a natural number, for example, m=11). The driving lines X0 through Xn may be called horizontal lines, and the sensing lines Y0 through Ym may be called vertical lines.

In some cases, some of the driving lines X0 through Xn, for example, odd-numbered driving lines, may respectively transmit driving signals which are provided to the left side of the touch screen panel 20, and the others, for example, even-numbered driving lines, may respectively transmit driving signals which are provided to the right side of the touch screen panel 20. In other cases, the driving lines X0 through Xn may be arranged so as to respectively transmit a plurality of driving signals which are provided to the left or right side of the touch screen panel 20.

The driving lines X0 through Xn may be electrically separated from each other and the sensing lines Y0 through Ym may be electrically separated from each other, due to a bridge connection that is similar to a via process in CMOS technology. A mutual capacitance node MC is formed at a crossing point between each of the driving lines X0 through Xn and each of the sensing lines Y0 through Ym, as shown in FIGS. 1A and 1B. Accordingly, a 2-dimensional mutual capacitance profile of (n+1)*(m+1) may be obtained from the touch screen panel 20.

When a finger or a conductive material touches the touch screen panel 20, the mutual capacitance profile of the capacitive touch screen panel 20 varies. Accordingly, the touch screen sensor IC 30 may find or sense a touch point accurately according to a change in the mutual capacitance profile.

In other words, the touch screen sensor IC 30 supplies driving signals to the driving lines X0 through Xn, respectively, processes sensing signals respectively output from the sensing lines Y0 through Ym, and transmits signals corresponding to results of the processing to the host controller 40.

A structure and an operation of the touch screen sensor IC 30 will be described in detail with reference to FIGS. 2 through 18.

Figure 2:
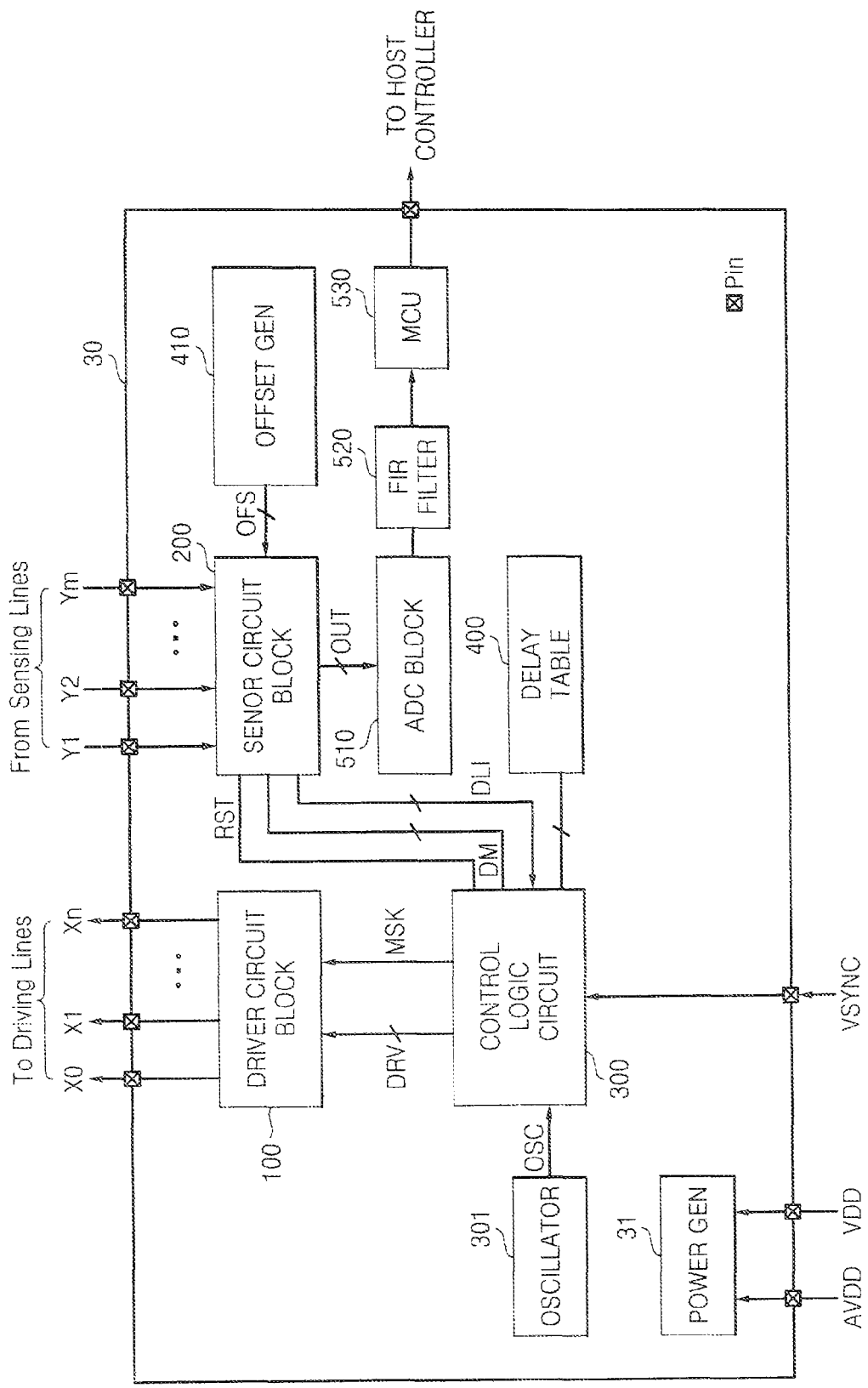
FIG. 2 is a schematic block diagram of the touch screen sensor IC illustrated in FIG. 1A according to an example embodiment.

FIG. 2 is a schematic block diagram of the touch screen sensor IC illustrated in FIG. 1A.

Referring to FIG. 2, the touch screen sensor IC 30 includes a power generator 31, a driver circuit block 100, a sensor circuit block 200, a control logic circuit 300, an oscillator 301, a delay table 400 (more precisely, a memory that stores a delay table), an offset generator 410, an analog-to-digital converter (ADC) block 510, a digital finite impulse response (FIR) filter 520, and a micro controller unit (MCU) 530.

The power generator 31 generates power or a voltage, which is required by the touch screen sensor IC 30, by using a plurality of voltages, namely, voltages AVDD and VDD, which are received from an external source.

For example, the power generator 31 may include a DC-DC converter which generates a voltage required to operate each of the components 100, 200, 410, and 510, and a low-dropout (LDO) regulator which generates a voltage required to operate the control logic circuit 300.

The driver circuit block 100 may supply driving signals to the driving lines X0 through Xn, respectively, or block the driving signals from going to the driving lines X0 through Xn, in response to a mask control signal MSK output from the control logic circuit 300 and a plurality of driving signals DRV output from the control logic circuit 300.

Figure 3:
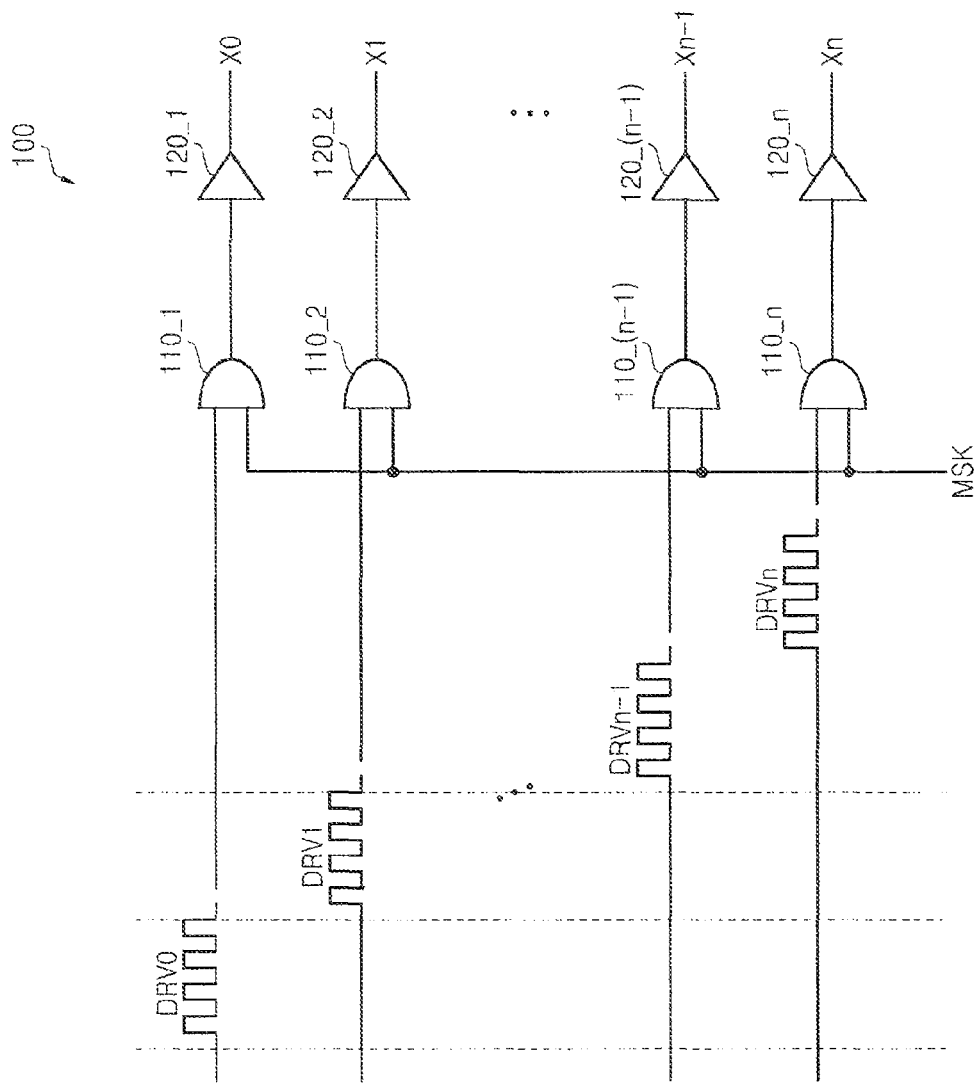
FIG. 3 is a schematic block diagram of a driver circuit block illustrated in FIG. 2 according to an example embodiment.
Figure 4:
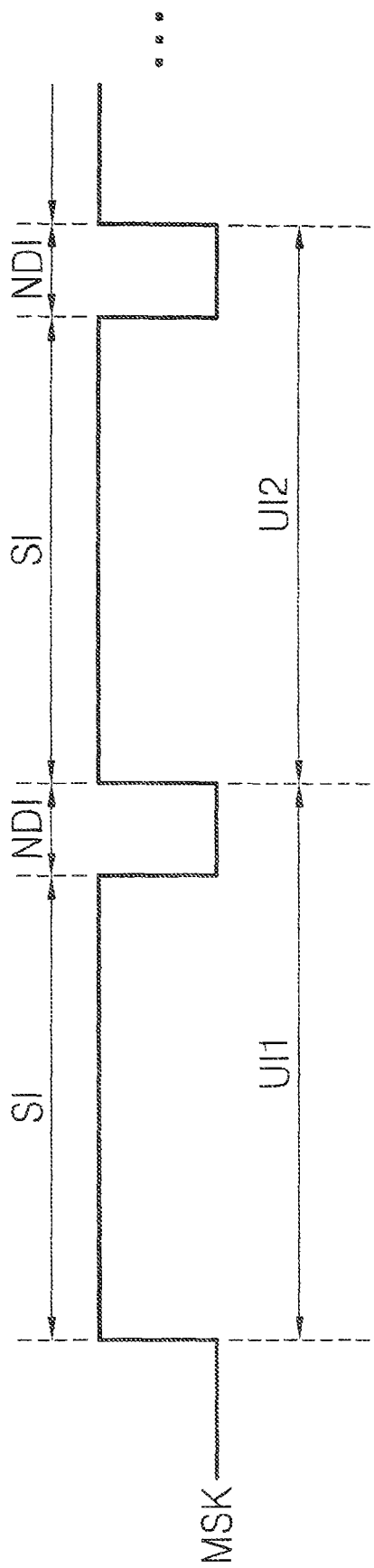
FIG. 4 is a waveform diagram of a mask signal illustrated in FIG. 3.

FIG. 3 is a schematic block diagram of the driver circuit block 100 illustrated in FIG. 2, and FIG. 4 is a waveform diagram of an example embodiment of the mask control signal MSK illustrated in FIG. 3.

Referring to FIGS. 2 through 4, the driver circuit block 100, which performs a function of a transmitter, includes a plurality of mask circuits 110_1 through 110_n and a plurality of drivers 120_1 through 120_n.

The mask circuits 110_1 through 110_n may transmit a plurality of driving signals DRV0 through DRVn to the drivers 120_1 through 120_n, respectively, or mask (or block) the driving signals DRV0 through DRVn from entering the drivers 120_1 through 120_n, in response to the mask control signal MSK. For example, as shown in FIG. 3, the driving signals DRV0 through DRVn may be square waves that are sequentially generated without overlapping each other. The driving signals DRV includes the driving signals DRV0 through DRVn.

For example, each of the mask circuits 110_1 through 110_n may be implemented using an AND gate. Accordingly, when the mask control signal MSK is at logic 1 or a second level, for example, a high level, the AND gate transmits a driving signal to a driver. When the mask control signal MSK is at logic 0 or a first level, for example, a low level, the AND gate masks (or blocks) the driving signal from being transmitted to the driver.

For example, each of the drivers 120_1 through 120_n may be implemented using an inverter chain. Respective output terminals of the drivers 120_1 through 120_n are connected to the driving lines X0 through Xn, respectively. For example, the driver circuit block 100 sequentially supplies the driving signals DRV0 through DRVn to the driving lines X0 through Xn, respectively, during a sensing interval SI in response to the mask control signal MSK at the second level.

On the other hand, the driver circuit block 100 blocks the driving signals DRV0 through DRVn from being supplied to the driving lines X0 through Xn, during a noise detection interval NDI in response to the mask control signal MSK at the first level.

Referring to FIG. 4, each unit interval UI1 and UI2 includes a sensing interval SI and a noise detection interval NDI. For example, each of the unit intervals UI1 and UI2 may be a frame.

Figure 6:
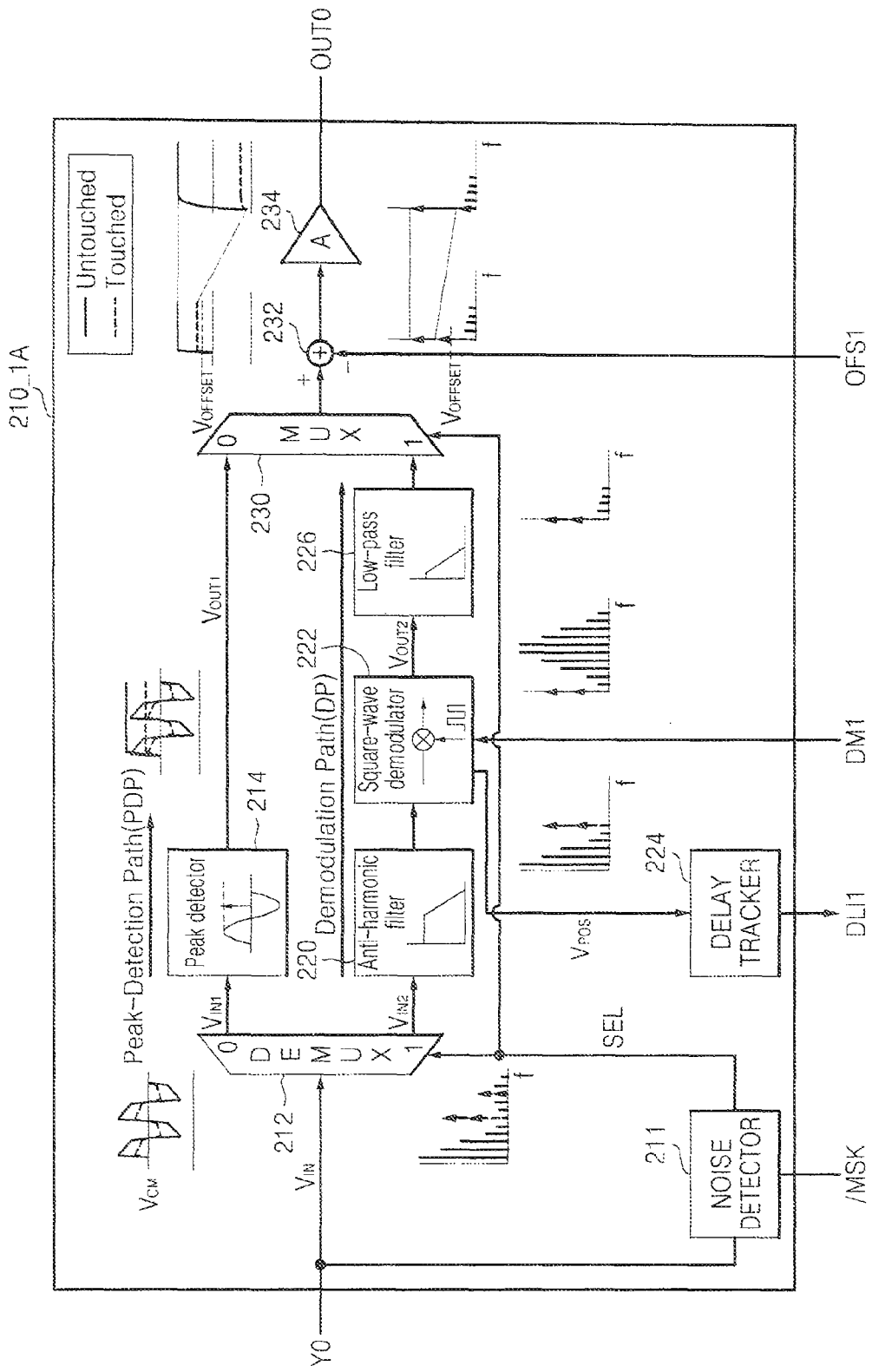
FIG. 6 is a block diagram of one example embodiment of a unit sensor circuit illustrated in FIG. 5.
Figure 12:
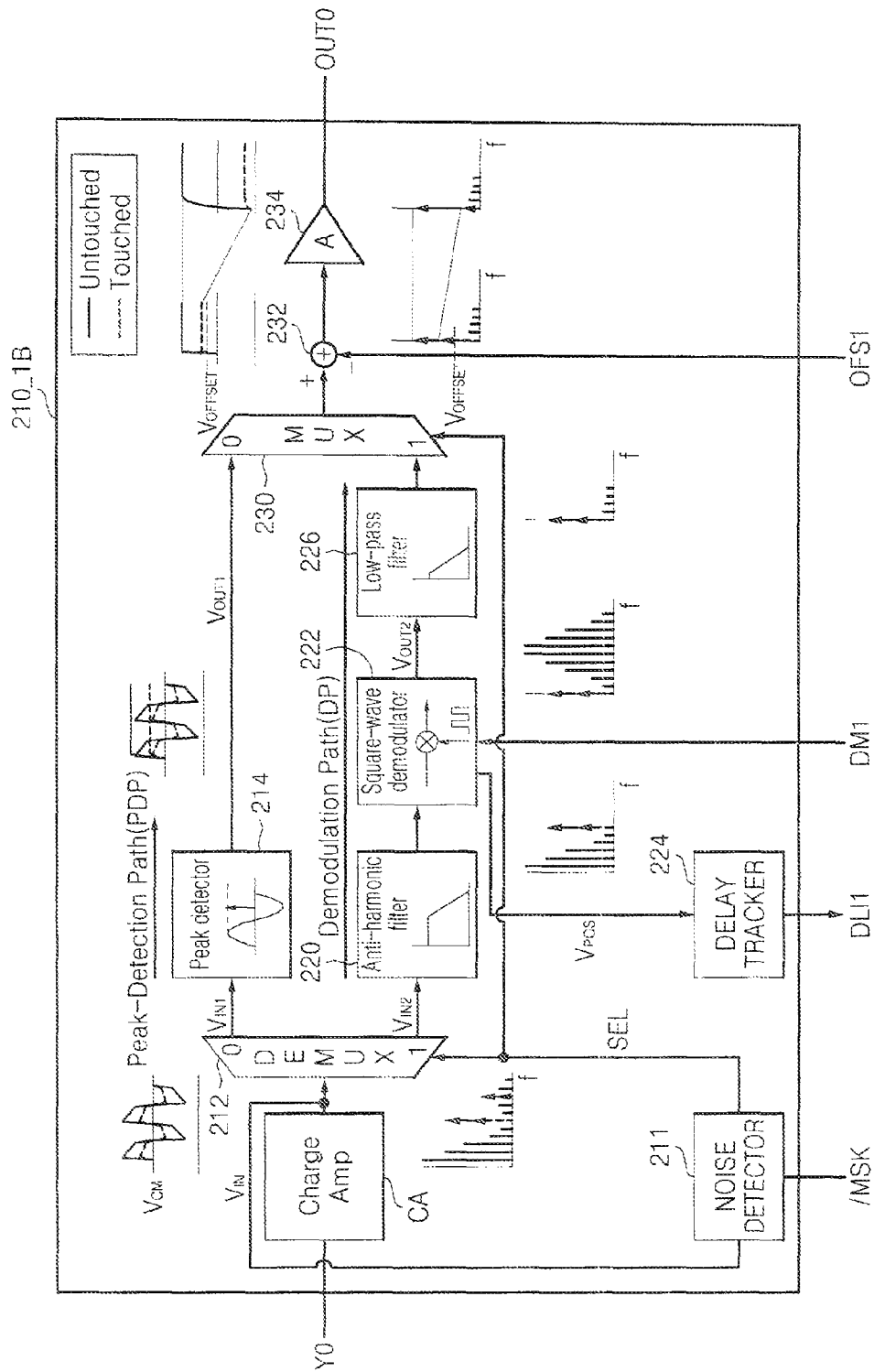
FIG. 12 is a block diagram of another example embodiment of the unit sensor circuit illustrated in FIG. 5.

During the noise detection interval NDI, a noise detector 211 illustrated in FIGS. 6 and 12 is enabled in response to the mask control signal MSK, for example, the mask control signal MSK at the first level. /MSK is an inverted version obtained by inverting the mask control signal MSK.

Thus, during the noise detection interval NDI, the noise detector 211 may detect a signal level of each sensing line, for example, a level of a noise signal, and output a selection signal SEL corresponding to a result of the detection to first and second selectors 212 and 230. During the sensing interval SI, the selection signal SEL may be maintained without changes.

Figure 5:
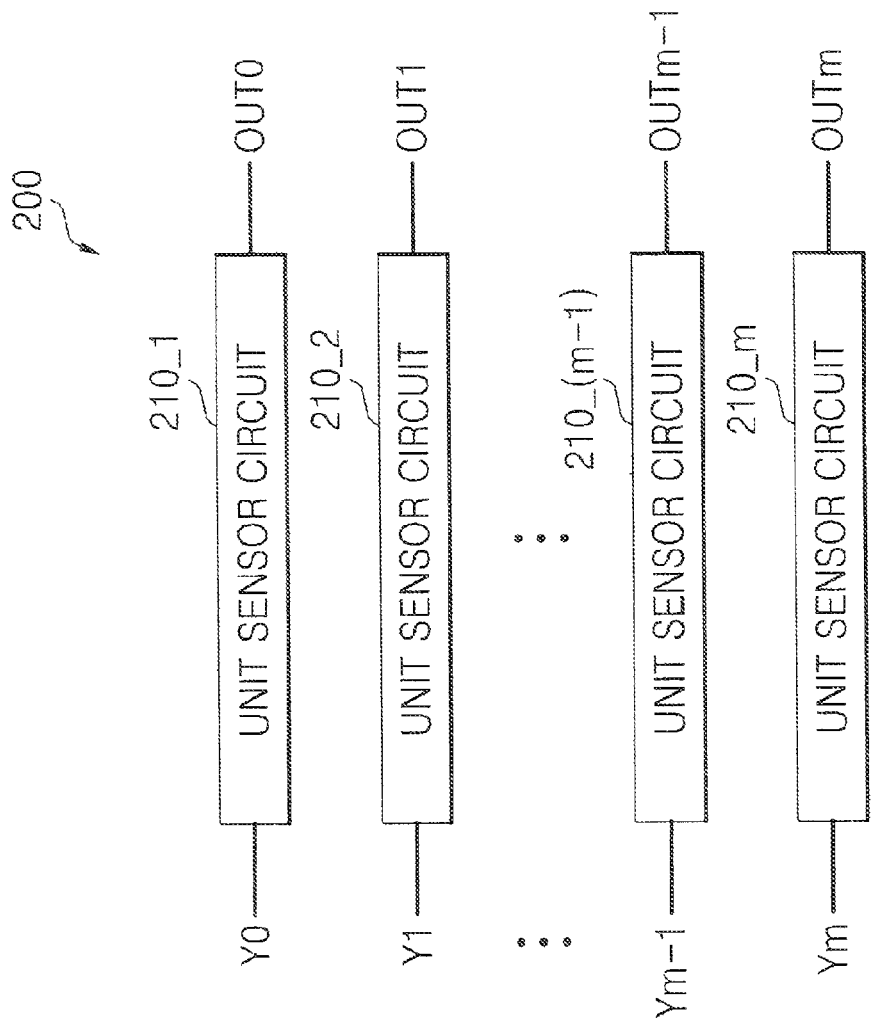
FIG. 5 is a schematic block diagram of a sensor circuit block illustrated in FIG. 2 according to an example embodiment.

FIG. 5 is a schematic block diagram of the sensor circuit block 200 illustrated in FIG. 2.

Referring to FIG. 5, the sensor circuit block 200 includes a plurality of unit sensor circuits, namely, first through m-th unit sensor circuits 210_1 through 210_m, the number of which corresponds to the number of first through m-th sensing lines Y0 through Ym. The first through m-th unit sensor circuits 210_1 through 210_m, which perform a function of a receiver, share the delay table 400 and the offset generator 410 illustrated in FIG. 2.

FIG. 6 is a block diagram of a first unit sensor circuit 210_1A, which is an embodiment of each unit sensor circuit illustrated in FIG. 5.

Since the first through m-th unit sensor circuits 210_1 through 210_m have the same structures, only a structure and operation of the first unit sensor circuit 210_1A will now be described for convenience of explanation.

Referring to FIG. 6, the first unit sensor circuit 210_1A, which is an embodiment of the first unit sensor circuit 210_1 of FIG. 5, includes two paths for processing an input signal VIN received via the first sensing line Y0, for example, a demodulation path (DP) and a peak-detection path (PDP). The PDP may be also called a non-demodulation path. In some cases, the paths for processing the input signal VIN may be three or more paths. The paths may denote path circuits.

The first unit sensor circuit 210_1A includes the noise detector 211, a first selector 212, a peak detector 214, an anti-harmonic filter 220, a square-wave demodulator 222, a delay tracker 224, a low-pass filter (LPF) 226, a second selector 230, a subtractor 232, and an amplifier 234.

During the noise detection interval NDI, the noise detector 211 is enabled in response to the mask control signal MSK at a first level, for example, a low level, or an inverted mask control signal /MSK at a second level. As described above with reference to FIGS. 3 and 4, during the noise detection interval NDI, the mask circuits 110_1 through 110-n block the driving signals DRV0 through DRVn from being transmitted to the drivers 120_1 through 120-n, respectively, in response to the mask control signal MSK at the first level.

In response to the inverted mask control signal /MSK at the second level, the noise detector 211 detects a level of the input signal VIN, namely, a noise signal VIN, received via the first sensing line Y0, and outputs the selection signal SEL corresponding to a result of the detection.

Figure 7:
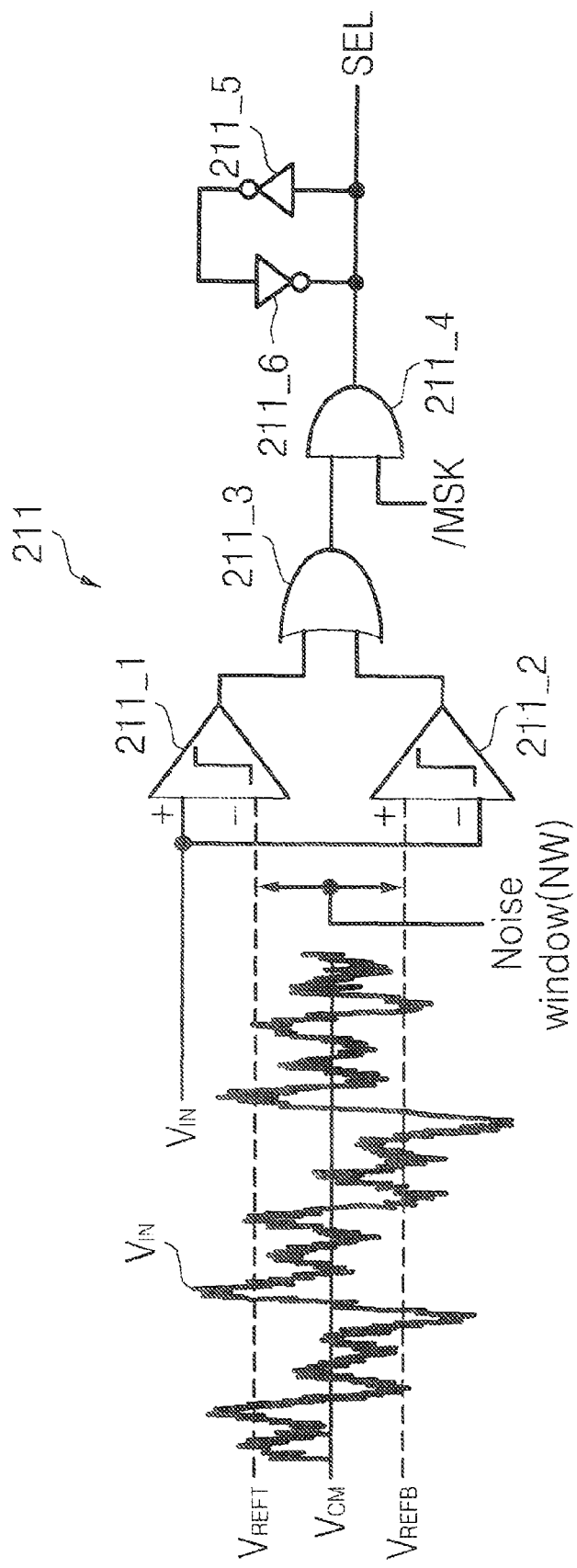
FIG. 7 shows a circuit diagram of a noise detector illustrated in FIG. 6 according to an example embodiment and a waveform diagram of an input signal of the noise detector.

For example, when the level of the noise signal VIN exists within the range of a noise window NW of FIG. 7, the noise detector 211 outputs the selection signal SEL at the first level. Thus, during the sensing interval SI, the selection signal SEL at the first level is maintained without changes as shown in FIG. 7, and thus a signal of the first sensing line Y0 is processed via the PDP.

On the other hand, when the level of the noise signal VIN exceeds the noise window NW, the noise detector 211 outputs the selection signal SEL at the second level, for example, the high level. Thus, during the sensing interval SI, the selection signal SEL at the second level is maintained without changes as shown in FIG. 7, and thus the signal of the first sensing line Y0 is processed via the DP. The noise detector 211 outputs the selection signal SEL capable of controlling the operations of the first and second selectors 212 and 230 according to the levels of the detected noise signal VIN.

FIG. 7 shows a circuit diagram of the noise detector 211 illustrated in FIG. 6 and a waveform diagram of the input signal VIN, that is, the noise signal VIN, of the noise detector 211. Referring to FIG. 7, the noise detector 211 includes a first comparator 211_1, a second comparator 211_2, an OR gate 211_3, an AND gate 211_4, and an inverter latch.

The first comparator 211_1 compares a level of the noise signal VIN received via the first sensing line Y0 with a level of a first reference signal VREFT. For example, the noise signal VIN may be input to a (+) input terminal of the first comparator 211_1, and the first reference signal VREFT may be input to a (−) input terminal of the first comparator 211_1.

The second comparator 211_2 compares the level of the noise signal VIN received via the first sensing line Y0 with a level of a second reference signal VREFB. For example, the noise signal VIN may be input to a (−) input terminal of the second comparator 211_2, and the second reference signal VREFB may be input to a (+) input terminal of the second comparator 211_2.

The noise window NW may be determined according to a difference between the level of the first reference signal VREFT and the level of the second reference signal VREFB. In FIG. 7, VCM may be a common mode voltage level. Accordingly, the level of the first reference signal VREFT may be symmetrical to that of the second reference signal VREFB about the common mode voltage level VCM.

The OR gate 211_3 performs an OR operation with respect to an output signal of the first comparator 211_1 and an output signal of the second comparator 211_2. The AND gate 211_4 may perform an AND operation with respect to the inverted mask control signal /MSK and an output signal of the OR gate 211_3 and output a selection signal SEL corresponding to a result of the AND operation to each of the first and second selectors 212 and 230.

The inverter latch includes inverters 211_5 and 211_6 and latches the selection signal SEL output from the AND gate 211_4.

During the sensing interval SI, the first selector 212 may transmit the signal of the first sensing line Y0 via either the PDP or the DP according to a level of the selection signal SEL latched by the inverter latch.

The first selector 212 may be a demultiplexer (DEMUX). Accordingly, the DEMUX may transmit the input signal VIN of the first sensing line Y0 to the peak detector 214 according to the selection signal SEL at the first level. In addition, the DEMUX may transmit the input signal VIN of the first sensing line Y0 to the anti-harmonic filter 220 according to the selection signal SEL at the second level. During the sensing interval SI, as shown in FIG. 8, the peak detector 214 may detect a peak value VOUT1 of an output signal VIN1 of a first output terminal of the first selector 212 and may maintain the peak value VOUT1.

Figure 8:
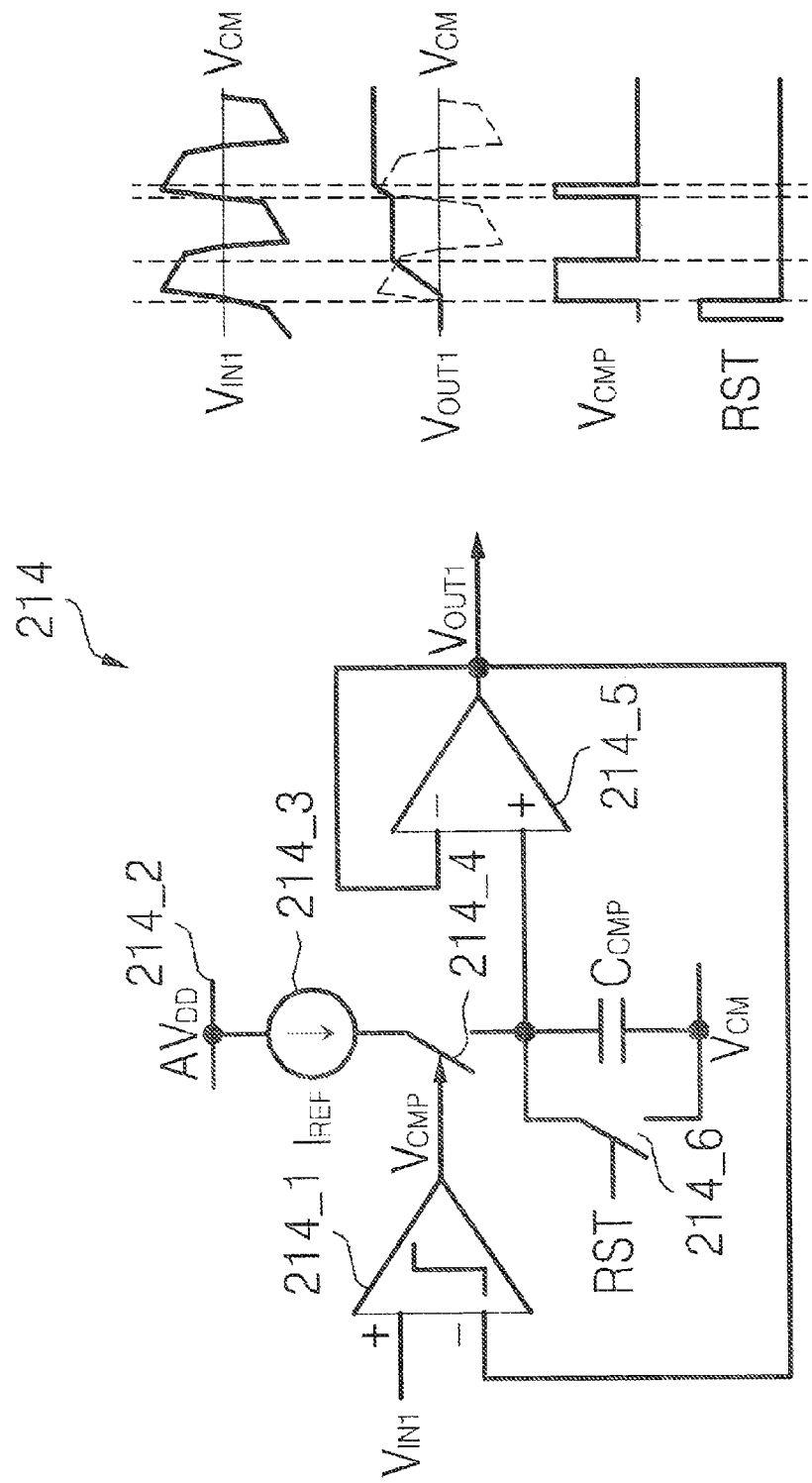
FIG. 8 shows a circuit diagram of a peak detector illustrated in FIG. 6 according to an example embodiment and a waveform diagram of input/output signals of the peak detector.

FIG. 8 shows a circuit diagram of the peak detector 214 illustrated in FIG. 6 and a waveform diagram of input/output signals of the peak detector 214.

Referring to FIGS. 6 and 8, the peak detector 214 includes a comparator 214_1, a capacitor CCMP, a current source 214_3, a first switch 214_4, a buffer amplifier 214_5, and a second switch 214_6. For convenience of explanation, it is assumed that the first and second switches 214_4 and 214_6 are respectively turned on according to a comparison signal VCMP and a reset signal RST at a second level. Each of the first and second switches 214_4 and 214_6 may be implemented using an NMOS transistor.

During the sensing interval SI, the comparator 214_1 compares the level of the output signal VIN1 of the first output terminal of the first selector 212 with that of the output signal VOUT1 of the buffer amplifier 214_5 and outputs the comparison signal VCMP, which corresponds to a result of the comparison.

The current source 214_3 is connected between the power line 214_2, which supplies an operational voltage AVDD and the first switch 214_4. The comparator 214_1 outputs the comparison signal VCMP at the second level when the level of the output signal VIN1 of the first output terminal of the first selector 212 is higher than that of the output signal VOUT1 of the buffer amplifier 214_5.

The first switch 214_4 is turned on based on the comparison signal VCMP at the second level and supplies a current IREF of the current source 214_3 to the capacitor CCMP. Accordingly, the capacitor CCMP is charged according to the received current IREF, and thus a voltage of a (+) input terminal of the buffer amplifier 214_5 increases.

The comparator 214_1 outputs the comparison signal VCMP at the first level when the level of the output signal VIN1 of the first output terminal of the first selector 212 is lower than that of the output signal VOUT1 of the buffer amplifier 214_5. Since the first switch 214_4 is turned off according to the comparison signal VCMP at the first level, charges charged in the capacitor CCMP are maintained as it is.

The second switch 214_6 is connected between two terminals of the capacitor CCMP, and sufficiently discharges the charges charged in the capacitor CCMP, in response to the reset signal RST at the second level output from the control logic circuit 300. The reset signal RST has a pulse shape and has only to be generated until shortly before the sensing interval SI begins.

Figure 9:
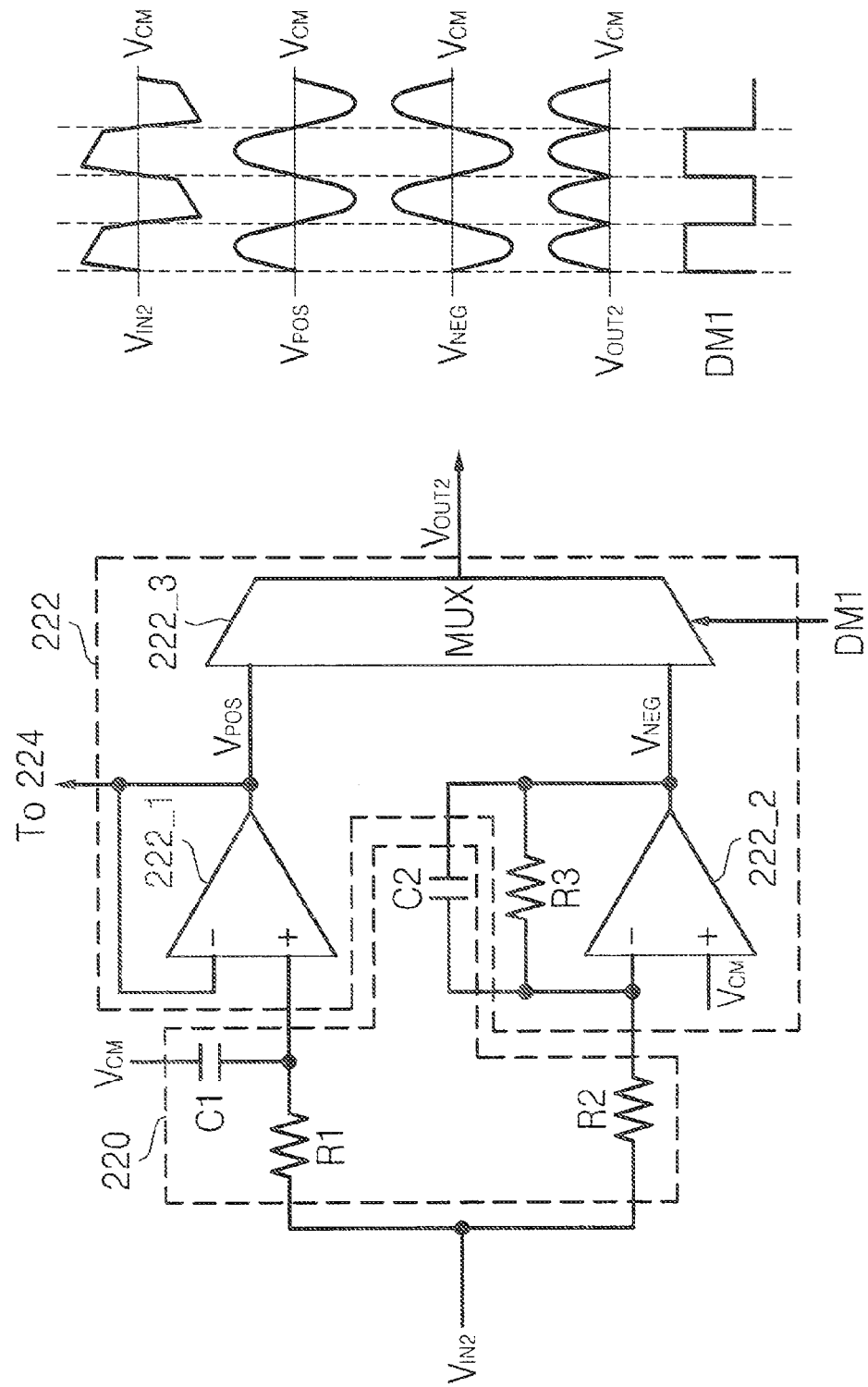
FIG. 9 shows a circuit diagram of a square-wave demodulator with a built-in anti-harmonic filter illustrated in FIG. 6 according to an example embodiment and a waveform diagram of input/output signals of the square-wave demodulator.

FIG. 9 shows a circuit diagram of the square-wave demodulator 222 with a built-in anti-harmonic filter illustrated in FIG. 6 and a waveform diagram of input/output signals of the square-wave demodulator 222.

The anti-harmonic filter 220 of FIG. 6 removes a noise signal, for example, a noise signal included in harmonic bands, from an output signal VIN2 of a second output terminal of the first selector 212. The square-wave demodulator 222 of FIG. 6 demodulates an output signal of the anti-harmonic filter 220.

However, the square-wave demodulator 222 of FIG. 9 has a built-in anti-harmonic filter 220, and includes a plurality of capacitors, namely, capacitors C1 and C2, a plurality of resistors, namely, registers R1, R2, and R3, a plurality of operational amplifiers, namely, first and second operational amplifiers 222_1 and 222_2, and a selector 222_3.

In some cases, the capacitors C1 and C2 may be designed so as to have the same capacitances, and the resistors R1, R2, and R3 may be designed so as to have the same resistances or different resistances.

When the output signal VIN2 of the second output terminal of the first selector 212 is received via the resistor R1, the first operational amplifier 222_1 generates a positive buffered output voltage VPOS. When the output signal VIN2 of the second output terminal of the first selector 212 is received via the resistor R2, the second operational amplifier 222_2 generates a negative buffered output voltage VNEG. The positive buffered output voltage VPOS is output to the delay tracker 224.

In this process, a pair of the resistor R1 and the capacitor C1 performs a function of an anti-harmonic filter, and a pair of the resistor R2 and the capacitor C2 performs a function of an anti-harmonic filter. A cut-off frequency of each of the anti-harmonic filters may be determined according to a product of the resistance of the resistor R1 and the capacitance of the capacitor C1 or a product of the resistance of the resistor R2 and the capacitance of the capacitor C2.

The second operational amplifier 222_2, the resistor R2, and the capacitor C2 form a negative unit gain feedback or a negative unit gain feedback loop, and the first operational amplifier 222_1, the resistor R1, and the capacitor C1 form a unit gain feedback or a unit gain feedback loop. The unit gain feedback or the unit gain feedback loop is additionally included for delay matching between delay of the first operational amplifier 222_1 and delay of the second operational amplifier 222_2.

The selector 222_3 outputs the positive buffered output voltage VPOS or the negative buffered output voltage VNEG as a demodulation voltage VOUT2 to the LPF 226, in response to a selection signal DM1 output from the control logic circuit 300. The selector 222_3 may be implemented using a multiplexer (MUX). The selection signal DM1 denotes a selection signal which is supplied to the first unit sensor circuit 210_1. Accordingly, DM shown in FIG. 2 denotes a set of the selection signals respectively supplied to the first through m-th unit sensor circuit 210_1 through 210_m.

The LPF 226 performs low-pass filtering with respect to the demodulation voltage VOUT2 output from the selector 222_3 in order to remove a noise signal from the demodulation voltage VOUT2. The LPF 226 may be implemented using a 4-th order Butterworth filter. The 4-th order Butterworth filter may be used together with a Sallen-Key topology or a Sallen-Key configuration.

As shown in FIG. 9, the input signal VIN2 has unknown propagation phase delay because of the touch screen panel 20 and the first sensing line Y0. To minimize power consumption, the input signal VIN2 and the selection signal DM1 need to be in-phase.

When a difference between phases of the input signal VIN2 and the selection signal DM1 is θ, the input signal VIN2 is modeled into A cos(2πft+θ), and the selection signal DM1 is modeled into cos(2πft), a product of the input signal VIN2 and the selection signal DM1 is shown in Equation 1.

$$VOUT2(t) = \{\cos\theta + \cos(4\pi ft + \theta)\}A/2 \qquad \text{[Equation 1]}$$

Referring to Equation 1, a DC signal level having a maximum value with a zero phase delay is a function of θ. Accordingly, the difference between the phases of the input signal VIN2 and the selection signal DM1 needs to be adjusted. The delay tracker 224 may adjust the phases of the input signal VIN2 and the selection signal DM1 so that the input signal VIN2 and the selection signal DM1 are in phase.

Figure 10:
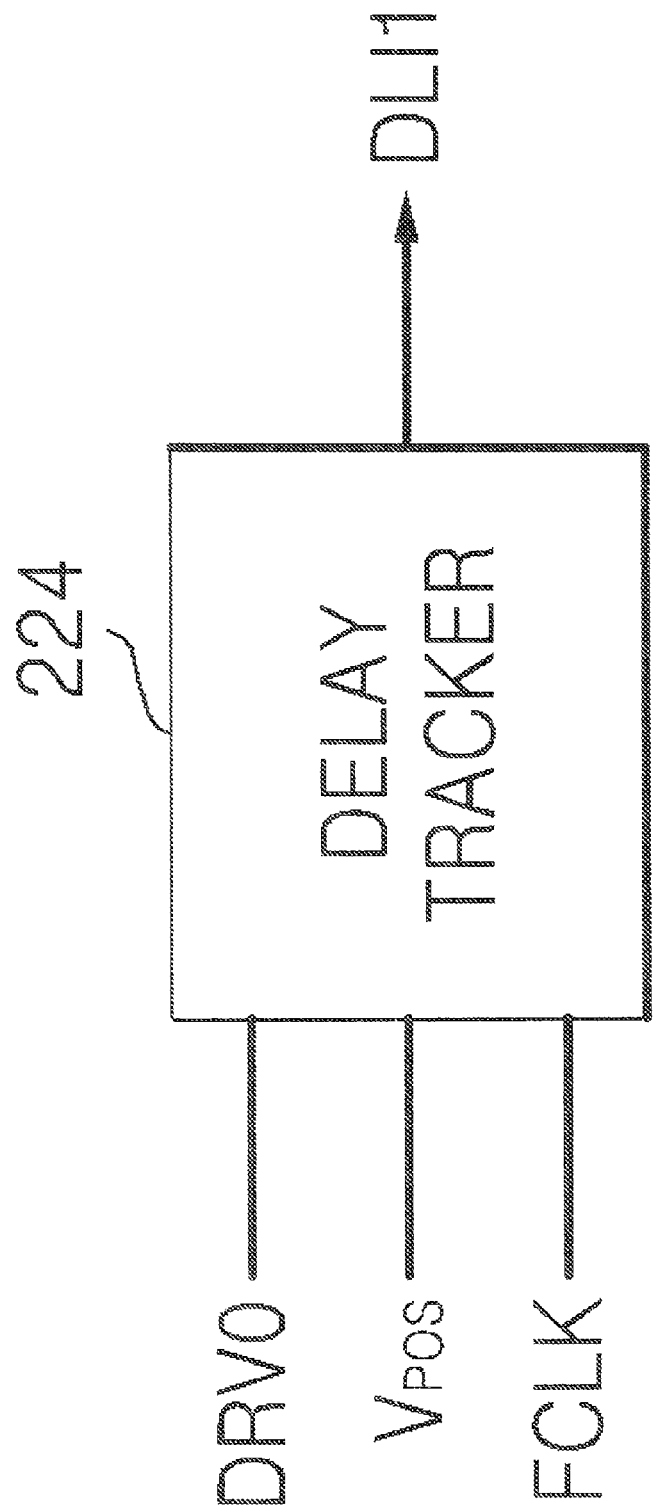
FIG. 10 is a block diagram of a delay tracker illustrated in FIG. 6 according to an example embodiment.
Figure 11:
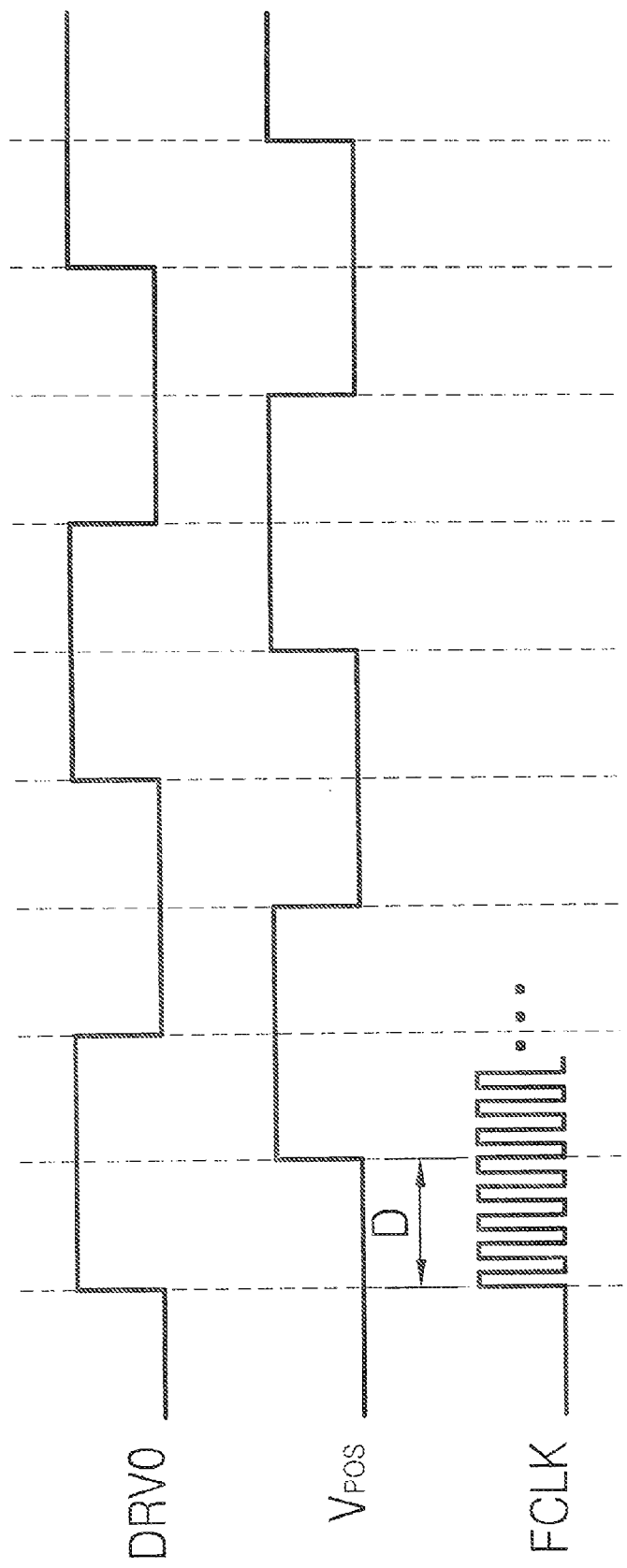
FIG. 11 is a waveform diagram of input signals for explaining an operation of the delay tracker illustrated in FIG. 10.

FIG. 10 is a block diagram of the delay tracker 224 illustrated in FIG. 6, and FIG. 11 is a waveform diagram of input signals for explaining an operation of the delay tracker 224 illustrated in FIG. 10.

The delay tracker 224, which is included in each of the first through m-th unit sensor circuits 210_1 through 210_m, receives a first driving signal DRV0, the positive buffered output voltage VPOS, and a fast clock signal FCLK. Here, it is assumed that the phase of the first driving signal DRV0 is the same as that of an output signal of a driving signal source implemented in the control logic circuit 300.

A propagation phase delay due to the touch screen panel 20 and the first sensing line Y0 exists between the first driving signal DRV0 and the positive buffered output voltage VPOS. Accordingly, the delay tracker 224 counts phase delay D between the first driving signal DRV0 and the positive buffered output voltage VPOS by using the fast clock signal FCLK and outputs phase delay information DLI1 corresponding to a result of the counting to the control logic circuit 300. The control logic circuit 300 stores the phase delay information DIl1 in the delay table 400.

In some cases, the delay tracker 224 generates the phase delay information DLI1 in real time or when the touch screen sensor IC 30 is initialized, and outputs the phase delay information DLI1 to the control logic circuit 300. In other words, a delay tracker included in each of the first through m-th unit sensor circuits 210_1 through 210_m generates phase delay information DLI in real time or when the touch screen sensor IC 30 is initialized, and outputs the phase delay information DLI to the control logic circuit 300. Accordingly, the control logic circuit 300 stores the phase delay information DLI for each of the first through m-th unit sensor circuits 210_1 through 210_m in the delay table 400.

The control logic circuit 300 reads respective phase delay information for the first through m-th unit sensor circuits 210_1 through 210_m from the delay table 400 and transmits selection signals corresponding to the read phase delay information to the respective selectors 222_3 of the respective square-wave demodulators 222 of the first through m-th unit sensor circuits 210_1 through 210_m, respectively. The selection signal DM of FIG. 2 includes the selection signals which are respectively transmitted to the respective selectors 222_3 of the respective square-wave demodulators 222 of the first through m-th unit sensor circuits 210_1 through 210_m.

Accordingly, the square-wave demodulator 222 of each of the first through m-th unit sensor circuits 210_1 through 210_m may receive the input signal VIN2 and the selection signal DM that are in phase.

Referring back to FIG. 6, the second selector 230 transmits to the subtractor 232 the output signal VOUT1 of the peak detector 214 included in the PDP or the output signal of the LPF 226 included in the DP based on the level of the selection signal SEL. The subtractor 232 is an example of an offset adjusting circuit capable of adjusting an offset of the output signal of the second selector 230.

The subtractor 232 subtracts a voltage VOFFSET1 of a first offset signal OFS1 from the output signal of the second selector 230 and transmits a signal corresponding to a result of the subtraction to the amplifier 234. The subtractor 232 may be replaced by an adder having an (−) input terminal.

The amplifier 234 amplifies the signal output from the subtractor 232 by a gain A and outputs an amplified signal OUT0 to the ADC block 510.

Referring back to FIG. 2, the control logic circuit 300 controls an overall operation of the touch screen sensor IC 30.

The control logic circuit 300 may control an operation of at least one of the components 31, 100, 200, 301, 400, 410, 510, 520, and 530.

The control logic circuit 300 may generate the reset signal RST for controlling a switching operation of the second switch 214_6 of the peak detector 214 of each of the first through m-th unit sensor circuits 210_1 through 210_m, and each selection signal DM for controlling an operation of the selector 222_3 of the square-wave demodulator 222 of each of the first through m-th unit sensor circuits 210_1 through 210_m.

The control logic circuit 300 may operate in synchronization of a vertical synchronization signal VSYNC input from an external source or may operate regardless of the vertical synchronization signal VSYNC.

The oscillator 301 may supply an oscillation signal OSC to the control logic circuit 300. The control logic circuit 300 may generate the driving signals DRV0 through DRVn (collectively, DRV) by using the oscillation signal OSC.

The delay table 400 may store the phase delay information for adjusting the phase delay D of each of the first through m-th unit sensor circuits 210_1 through 210_m, as described above with reference to FIGS. 10 and 11. The phase delay information stored in the delay table 400 may be referred to by the control logic circuit 300. The delay table 400 may be stored in a non-volatile memory or in a volatile memory such as static random access memory (SRAM).

The offset generator 410 may generate an offset signal OFS which is to be supplied to a subtractor of each of the first through m-th unit sensor circuits 210_1 through 210_m. The ADC block 510 includes a plurality of ADCs, each of which converts an analog output signal of each of the first through m-th unit sensor circuits 210_1 through 210_m to a digital signal. Each of the ADCs may be implemented using a successive approximation ADC (SAR ADC).

The digital FIR filter 520 removes residual noise from the digital signals output from the ADC block 510.

After sensing operations of all of the sensing lines Y0 through Ym are terminated, raw data of 2-dimensional matrix type output from the digital FIR filter 520 is transmitted to the MCU 530. The MCU 530 extracts X-coordinates and Y-coordinates for a true multi-touch from the raw data and transmits the X-coordinates and the Y-coordinates to the host controller 40. For example, the MCU 530 may transmit the X-coordinates and the Y-coordinates to the host controller 40 via an inter-integrated circuit (I2C).

Figure 13:
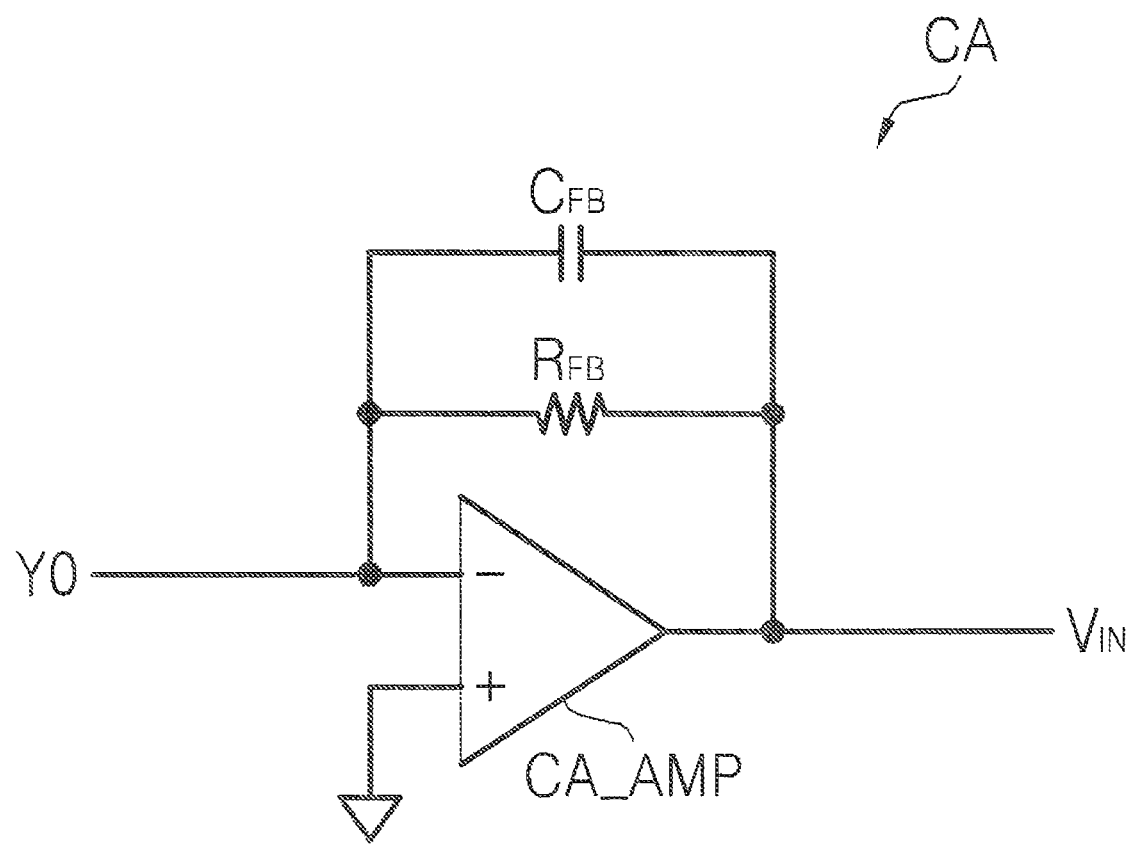
FIG. 13 is a circuit diagram of a charge amplifier illustrated in FIG. 12 according to an example embodiment.

FIG. 12 is a block diagram of a first unit sensor circuit 210_1B, which is another embodiment of each unit sensor circuit illustrated in FIG. 5. FIG. 13 is a circuit diagram of a charge amplifier CA illustrated in FIG. 12.

The first unit sensor circuit 210_1A is substantially the same as the first unit sensor circuit 210_1B except for the charge amplifier CA.

An AC current signal having a noise current signal is transmitted to the first unit sensor circuit 210_1B via the first sensing line Y0. The charge amplifier CA converts the AC current signal received via the first sensing line Y0 into an AC voltage signal. Accordingly, the charge amplifier CA is an example of a current-to-voltage converter.

During the noise detection interval NDI, the noise detector 211 detects a level of a noise signal VIN received via the first sensing line Y0, and outputs a selection signal SEL corresponding to a result of the detection. Accordingly, during the sensing interval SI, an output signal VIN of the charge amplifier CA is processed via a PDP or a DP based on a level of the selection signal SEL.

The charge amplifier CA includes an operational amplifier CA-AMP, a feedback resistor RFB connected between an input terminal and an output terminal of the operational amplifier CA-AMP, and a feedback capacitor CFB connected to the feedback resistor RFB in parallel.

Figure 14:
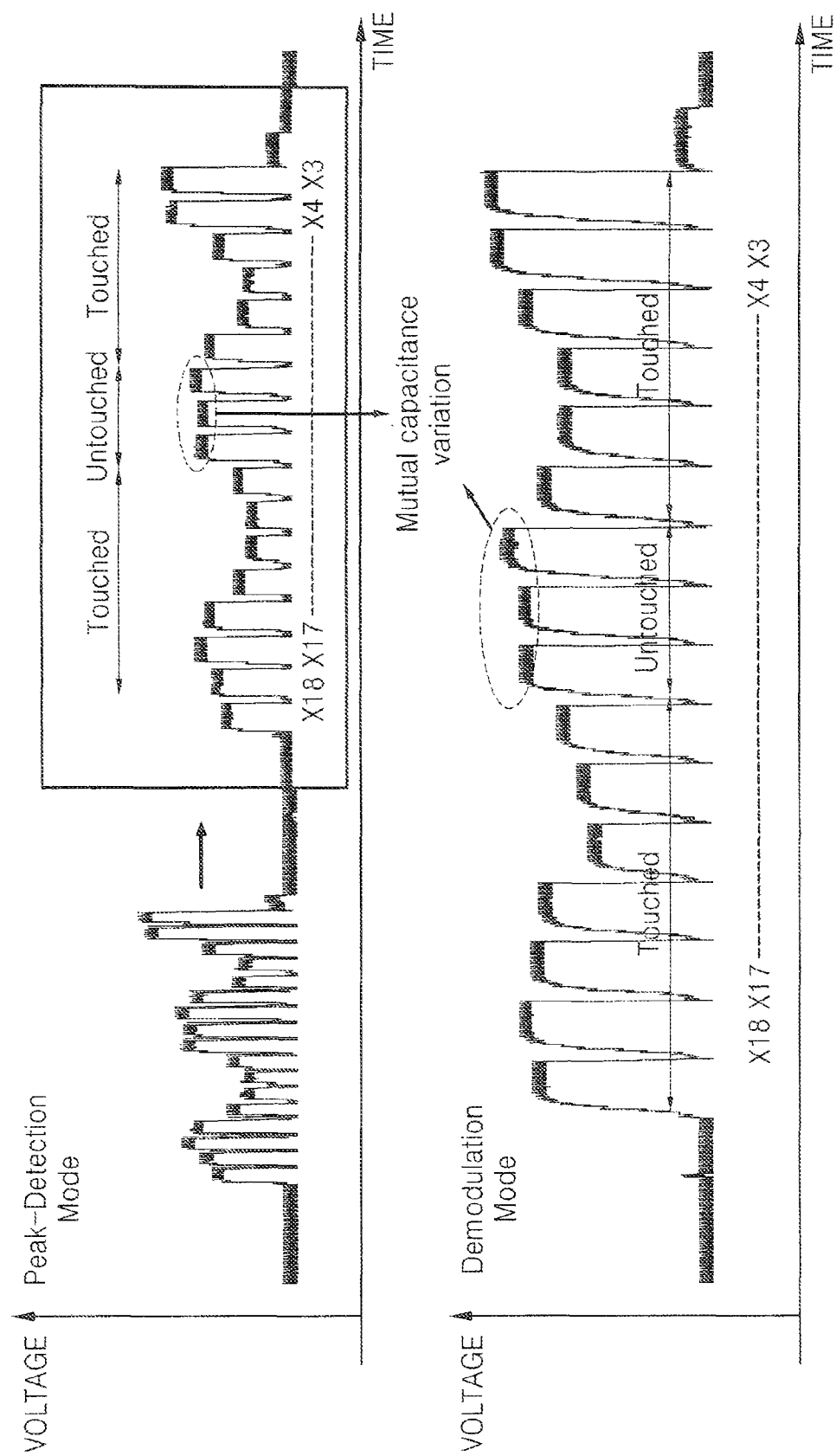
FIG. 14 is a waveform diagram of output signals of the sensor circuit block illustrated in FIG. 2.

FIG. 14 is a waveform diagram of output signals of the sensor circuit block 200 illustrated in FIG. 2.

FIG. 14 illustrates a waveform of a peak detection mode in which an output signal of a first sensing line Y0 for each of driving lines X3 through X18 is processed using the PDP, and a waveform of a demodulation mode in which the output signal of the first sensing line Y0 for each of the driving lines X3 through X18 is processed using the DP.

A sensing time of the peak detection mode is significantly shorter than that of the demodulation mode. In addition, because of narrow-band low-pass filtering, a settling time in the demodulation mode is longer than that in the peak detection mode.

In an untouched area Untouched, a mutual capacitance variation is observed by a process variation of the touch screen panel 30. Due to additional mutual capacitance caused by a routing close to the first sensing line Y0, mutual capacitance due to the driving lines X3 and X4 is greater than capacitance due to the other driving lines X18 through X5.

Each Xi (where i is 3 to 18) in FIG. 14 denotes an output signal of the amplifier 234 of the first unit sensing circuit 210_1A or 210_1B. In other words, each Xi of FIG. 14 corresponds to outputs signals OUT0 sequentially output from the amplifier 234.

Figure 15:
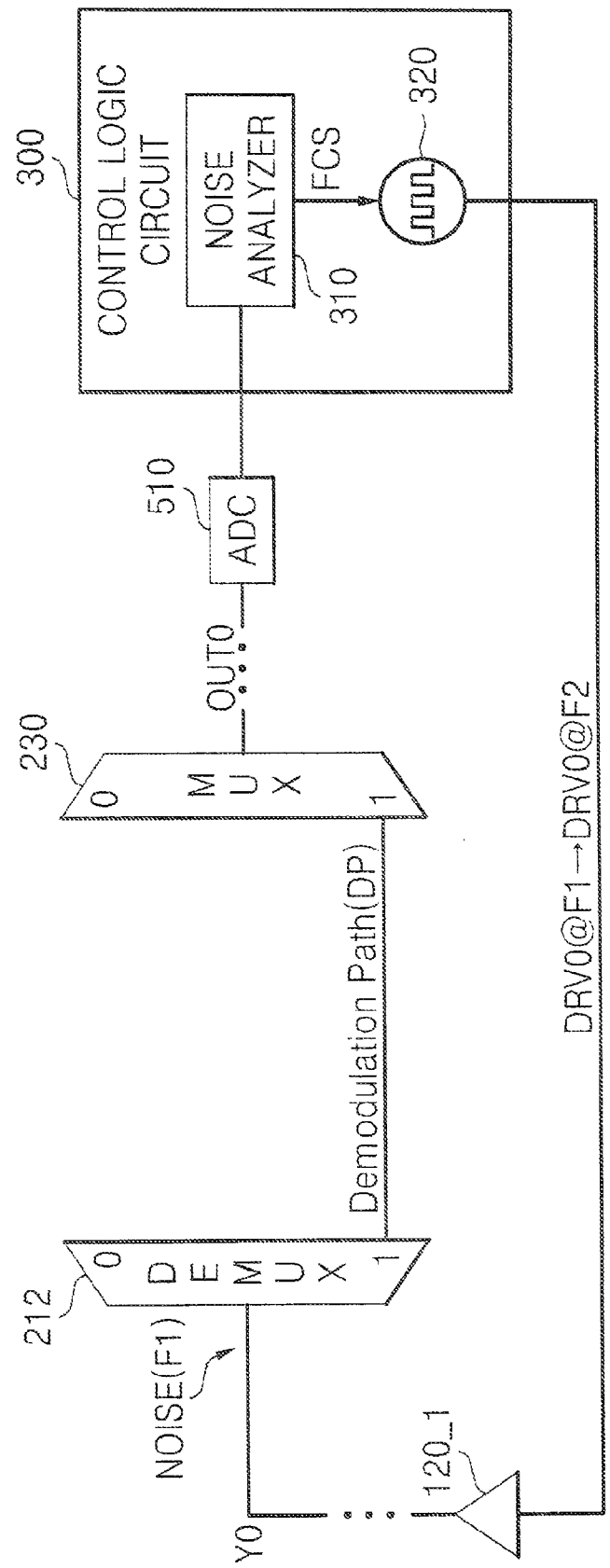
FIG. 15 is a block diagram for explaining a method of adjusting a source frequency by using a frequency shifting function, according to an example embodiment.

FIG. 15 is a block diagram for explaining a method of adjusting a source frequency by using a frequency shifting function, according to an example embodiment.

In the demodulation mode, to perform a frequency-shifting function, the driving signals DRV0 through DRVn are blocked from being respectively supplied to the driving lines X0 through Xn under the control of the control logic circuit 300. For example, the control logic circuit 300 outputs the mask control signal MSK having a low level in response to a control signal for controlling the frequency-shifting function. Accordingly, each of the first through m-th unit sensor circuits 210_1 through 210_m senses and amplifies a noise signal existing in a signal band.

The signals output from the sensor circuit block 200 are supplied to the ADC block 510, and the signals output from the ADC block 510 are output to a noise analyzer 310 of the control logic circuit 300. The noise analyzer 310 analyzes the noise signal existing in the signal band to generate a frequency change signal FCS corresponding to a result of the analysis. A frequency source 320 analyzes each frequency of the driving signals DRV0 through DRVn in response to the frequency change signal FCS.

For example, in the demodulation mode, when the frequency source 320 generates a first driving signal DRV0 having a first frequency F1, the first driving signal DRV0 is blocked from being supplied to the first sensing line Y0, and thereafter a noise signal NOISE(F1) having the same frequency as the first frequency F1 is detected from a signal band by the noise detector 211 or the noise analyzer 310, the noise analyzer 310 outputs a frequency change signal FCS for changing the first frequency F1 to the frequency source 320.

Accordingly, the frequency source 320 may generate a first driving signal DRV0 having a second frequency F2, and supply the first driving signal DRV0 having the second frequency F2 to the first sensing line Y0 in the demodulation mode. Thus, the control logic circuit 300 may determine whether noise exists in the signal band.

Figure 16:
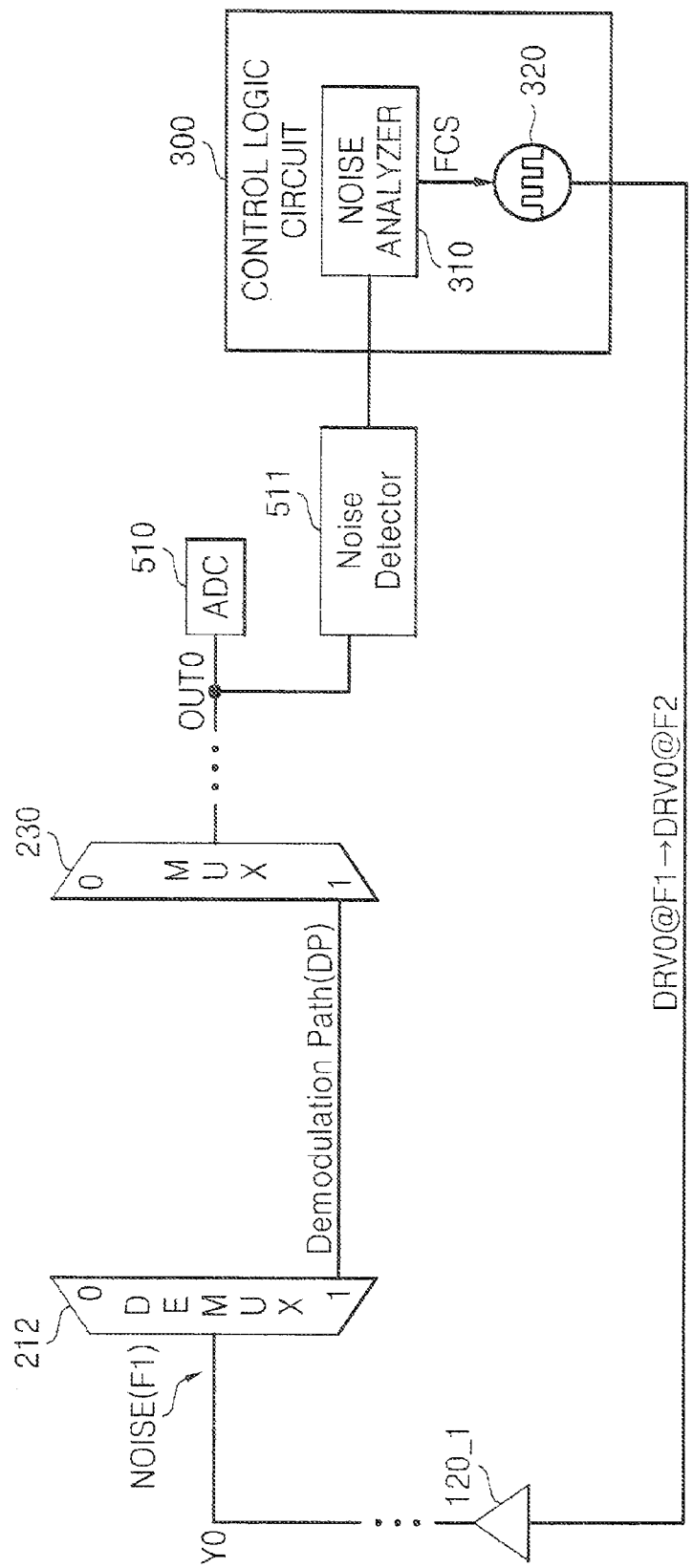
FIG. 16 is a block diagram for explaining a method of adjusting a source frequency by using a frequency shifting function, according to another example embodiment.

FIG. 16 is a block diagram for explaining a method of adjusting a source frequency by using a frequency shifting function, according to another example embodiment.

In the demodulation mode, to perform a frequency-shifting function, the driving signals DRV0 through DRVn are blocked from being respectively supplied to the driving lines X0 through Xn under the control of the control logic circuit 300. For example, the control logic circuit 300 outputs the mask control signal MSK at a low level in response to a control signal for controlling the frequency-shifting function. Accordingly, each of the first through m-th unit sensor circuits 210_1 through 210_m senses and amplifies a noise signal existing in a signal band.

For example, a signal OUT0 output from the first unit sensor circuit is output to the noise analyzer 310 of the control logic circuit 300. The noise analyzer 310 analyzes the noise signal existing in the signal band to generate a frequency change signal FCS corresponding to a result of the analysis.

A frequency source 320 analyzes the frequency of the first driving signal DRV0 in response to the frequency change signal FCS.

For example, in the demodulation mode, when the frequency source 320 generates a first driving signal DRV0 having a first frequency F1, the first driving signal DRV0 is blocked from being supplied to the first sensing line Y0, and thereafter a noise signal NOISE(F1) having the same frequency as the first frequency F1 is detected from the signal band by the noise detector 211 or 511, the noise analyzer 310 outputs a frequency change signal FCS for changing the first frequency F1 to the frequency source 320.

Accordingly, the frequency source 320 may generate a first driving signal DRV0 having a second frequency F2, and supply the first driving signal DRV0 having the second frequency F2 to the first sensing line Y0 in the demodulation mode. Thus, the control logic circuit 300 may determine whether noise exists in the signal band.

Figure 17:
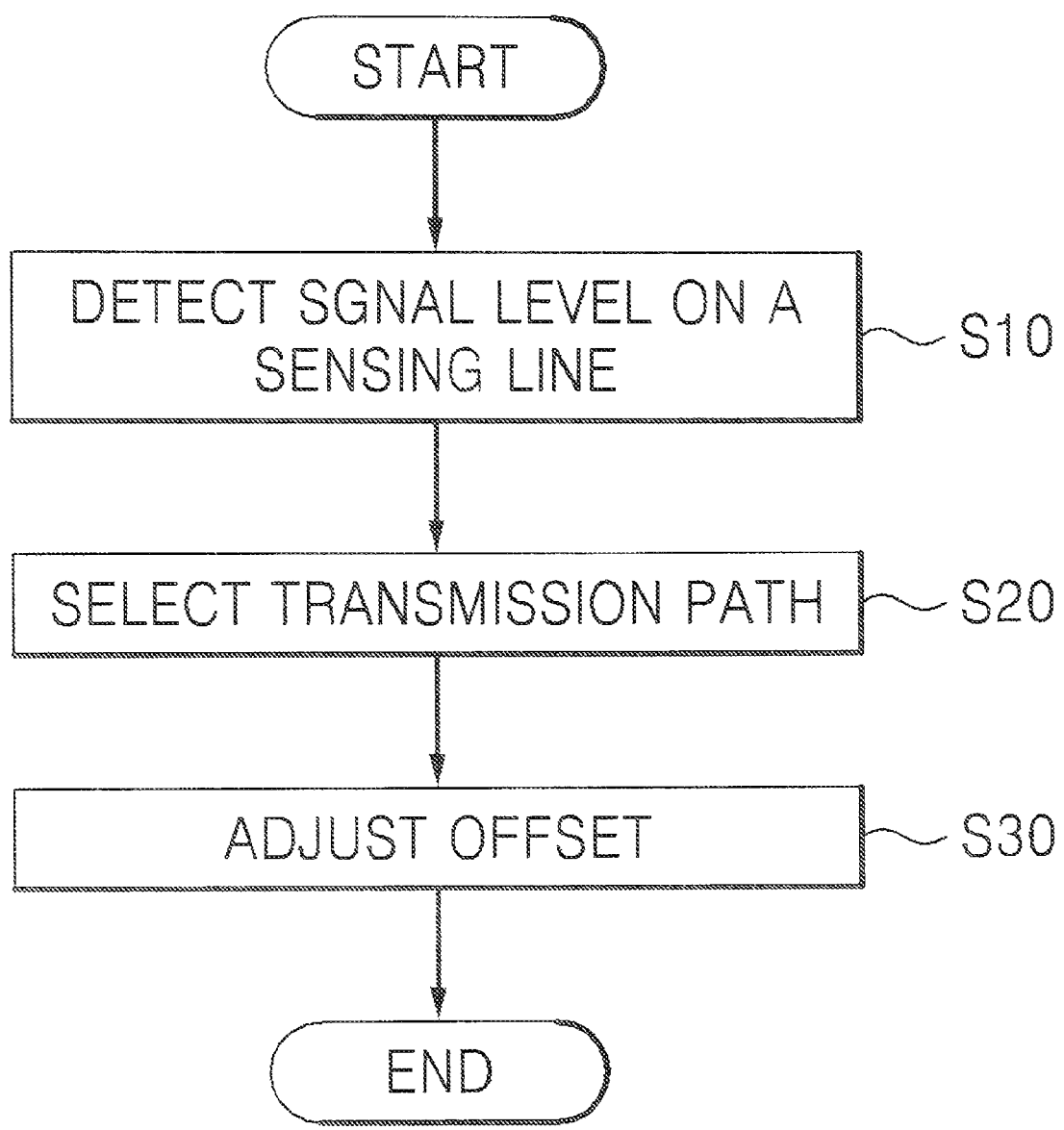
FIG. 17 is a flowchart of a method of processing a sensor signal by using the unit sensor circuit illustrated in FIG. 6 or 12 according to an example embodiment.

FIG. 17 is a flowchart of a method of processing a sensor signal by using the first unit sensor circuit 210_1A or 210_B illustrated in FIG. 6 or 12.

Referring to FIGS. 3, 4, 6, 12, and 17, during the noise detection interval NDI, the noise detector 211 detects a level of the signal VIN received via the first sensing line Y0 or the output signal VIN of the charge amplifier CA, that is, a level of the noise signal VIN, and outputs the selection signal SEL corresponding to a result of the detection, in operation S10.

The signal VIN received via the first sensing line Y0 or the output signal VIN of the charge amplifier CA is processed via a PDP or a DP based on a level of the selection signal SEL, in operation S20. In other words, a transmission path for the signal VIN received via the first sensing line Y0 or the output signal VIN of the charge amplifier CA is determined based on a level of the noise signal existing on the first sensing line Y0, in operation S20.

During the sensing interval SI, the subtractor 232 subtracts an offset signal from a signal corresponding to a result of the processing via the PDP or the DP, in operation S30. In other words, an offset of the signal corresponding to a result of the processing via the PDP or the DP is adjusted by the subtractor 232.

FIG. 18 is a flowchart of a method of adjusting a source frequency according to the embodiment illustrated in FIG. 16 or 17.

Referring to FIGS. 3, 16, 17, and 18, to perform a frequency-shifting function, the driving signals DRV0 through DRVn are blocked from being respectively supplied to the driving lines X0 through Xn, in operation S110. In some embodiments, each of the drivers 120_1 through 120_n may be disabled.

The DP is selected, in operation S120. Accordingly, only the noise signal NOISE(F1) exists in the signal VIN received via the first sensing line Y0 or the output signal VIN of the charge amplifier CA. In operation S130, the noise analyzer 310 detects and analyzes the noise signal NOISE(F1) included in the signal band of the signal VIN of the first sensing line Y0 or the signal band of the output signal VIN of the charge amplifier CA, in response to the output signal of the ADC block 510 of FIG. 15 or the output signal of the noise detector 511 of FIG. 16.

The noise analyzer 310 outputs a frequency change signal FCS corresponding to a result of the analysis. Accordingly, the frequency source 320 changes the first frequency F1 to the second frequency F2, in operation S140. After the frequency-shifting operation is completed, the driving signals DRV0 through DRVn each having the second frequency output from the frequency source 320 are provided to the driving lines X0 through Xn, respectively, in operation S150. At this time, each of the drivers 120_1 through 120_n may be enabled, in operation S150.

A touch screen sensor IC according to an example embodiment can accurately sense a true multi-touch and consume low power while providing high noise immunity.

While example embodiments have been particularly shown and described with reference to exemplary embodiments thereof, it will be understood that various changes in form and details may be made therein without departing from the spirit and scope of the following claims.

What is claimed is:

1. A method of operating a touch screen sensor integrated circuit (IC), the method comprising:
   determining if a first input signal output from a capacitive touch screen panel is within a noise window;
   selecting one of a demodulation path and a non-demodulation path based on the determining; and
   processing a second input signal output from the capacitive touch screen panel using the selected one of the demodulation path and the non-demodulation path.

2. The method of claim 1, wherein the selecting comprises:
   selecting the non-demodulation path if the first input signal is within the noise window and selecting the demodulation path if the first input signal is outside the noise window.

3. The method of claim 1, wherein the processing comprises:
   detecting a peak value of the second input signal and maintaining the detected peak value if the non-demodulation path is selected; and
   demodulating the second input signal if the demodulation path is selected.

4. The method of claim 3, wherein the demodulating of the second input signal includes:
   removing noise from the second input signal;
   demodulating the second input signal from which the noise has been removed; and
   removing noise from the demodulated second input signal.

5. The method of claim 4, wherein the demodulating the second input signal from which the noise has been removed includes:
   generating a positive buffered output voltage from the second input signal from which the noise has been removed using a unit gain feedback loop, and generating a negative buffered output voltage from the second input signal from which the noise has been removed using a negative unit gain feedback loop; and
   outputting one of the positive buffered output voltage and the negative buffered output voltage as the demodulated second input signal in response to a selection signal.

6. The method of claim 1, further comprising:
   adjusting an offset voltage of the processed second input signal.

7. A touch screen sensor integrated circuit (IC) comprising:
   a plurality of unit sensing circuits configured to sense and amplify signals output from a plurality of sensing lines of a capacitive touch screen panel, respectively,
   wherein each of the plurality of the unit sensing circuits includes,
      a first selector configured to transmit an input signal output from a corresponding sensing line to one of a demodulation path and a non-demodulation path in response to a selection signal;
      a second selector configured to output a signal output from the one of the demodulation path and the non-demodulation path in response to the selection signal; and
      a noise detector configured to determine if a noise signal output from the respective sensing line is within a noise window and output the selection signal according to a result of the determination during a noise detecting operation, and maintain the selection signal during a sensing operation.

8. The touch screen sensor IC of claim 7, wherein the demodulation path includes:
   a first filter configured to remove a noise signal from an output signal of the first selector;
   a demodulator configured to demodulate an output signal of the first filter; and
   a low pass filter (LPF) configured to perform low pass filtering with respect to an output signal of the demodulator.

9. The touch screen sensor IC of claim 8, wherein the first filter is an anti-harmonic filter and the demodulator is a square-wave demodulator.

10. The touch screen sensor IC of claim 7, wherein the non-demodulation path includes a peak detector configured to detect a peak value of an output signal of the first selector and maintain the detected peak value.

11. The touch screen sensor IC of claim 7, further comprising:
   an offset adjusting circuit configured to adjust an offset of the output signal of the second selector.

12. The touch screen sensor IC of claim 7, wherein, each of the plurality of the unit sensing circuits includes:
   a charge amplifier connected between the respective sensing line and the first selector, and the noise detector if configured to determine whether a noise signal output from the charge amplifier exists within the noise window and output the selection signal according to a result of the determination during the noise detecting operation.

13. A system comprising:
   the touch screen sensor IC of claim 7; and
   a host controller configured to communicate with the touch screen sensor IC.

14. The system of claim 13, wherein the demodulation path includes:
   a first filter configured to remove a noise signal from an output signal of the first selector;
   a demodulator configured to demodulate an output signal of the first filter; and a low pass filter (LPF) configured to perform low pass filtering with respect to an output signal of the demodulator.

15. The system of claim 13, wherein the non-demodulation path comprises a peak detector configured to detect a peak value of an output signal of the first selector and maintain the detected peak value.

16. A system comprising:
a panel including a plurality of driving lines and sensing lines; and
a sensor circuit block, the sensor circuit block including unit sensor circuits associated with the sensing lines, respectively, at least one unit sensor circuit including,
a first path and a second path, the unit sensor circuit configured to receive a signal on the associated sensing line, detect a noise on the associated sensing line, and process the received signal through one of the first path and the second path based on the detected noise, the first path configured to maintain a peak value associate with the received signal and the second path configured to demodulate the received signal.

17. The system of claim 16, wherein the second path includes:
a first filter configured to remove the noise;
a demodulator configured to demodulate an output signal of the first filter; and
a low pass filter (LPF) configured to perform low pass filtering with respect to an output signal of the demodulator.

18. The system of claim 16, wherein the first path includes a peak detector configured to detect the peak value associated with the received signal and maintain the detected peak value.

* * * * *